US011407843B2

(12) United States Patent
Obrecht et al.

(10) Patent No.: US 11,407,843 B2
(45) Date of Patent: Aug. 9, 2022

(54) PROCESS FOR PRODUCING NITRILE RUBBERS USING RUTHENIUM COMPLEX CATALYSTS

(71) Applicant: ARLANXEO DEUTSCHLAND GMBH, Dormagen (DE)

(72) Inventors: Werner Obrecht, Moers (DE); Sarah David, Dormagen (DE); Hiyam Salem, Cologne (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 11 days.

(21) Appl. No.: 16/770,804

(22) PCT Filed: Dec. 5, 2018

(86) PCT No.: PCT/EP2018/083643
§ 371 (c)(1),
(2) Date: Jun. 8, 2020

(87) PCT Pub. No.: WO2019/110658
PCT Pub. Date: Jun. 13, 2019

(65) Prior Publication Data
US 2020/0332030 A1 Oct. 22, 2020

(30) Foreign Application Priority Data
Dec. 8, 2017 (EP) .................................... 17206071

(51) Int. Cl.
| C08C 19/08 | (2006.01) |
| B01J 31/22 | (2006.01) |
| C08F 236/12 | (2006.01) |
| C08C 19/00 | (2006.01) |

(52) U.S. Cl.
CPC .......... C08C 19/08 (2013.01); B01J 31/2226 (2013.01); B01J 31/2273 (2013.01); C08F 236/12 (2013.01); B01J 2231/543 (2013.01); B01J 2531/821 (2013.01); C08C 2019/09 (2013.01)

(58) Field of Classification Search
CPC .. C08C 19/08; C08C 2019/09; B01J 31/2226; B01J 31/2273; B01J 2231/543; B01J 2531/821; B01J 2531/825; B01J 2540/225; B01J 2540/62; B01J 31/2208; B01J 31/226; B01J 31/2278; B01J 2540/442; C08F 236/12; C08F 8/50
See application file for complete search history.

(56) References Cited

U.S. PATENT DOCUMENTS

| 4,464,515 A | 8/1984 | Rempel et al. |
| 4,503,196 A | 3/1985 | Rempel et al. |
| 4,581,417 A | 4/1986 | Buding et al. |
| 4,631,315 A | 12/1986 | Buding et al. |
| 4,746,707 A | 5/1988 | Fiedler et al. |
| 4,795,788 A | 1/1989 | Himmler et al. |
| 4,978,771 A | 12/1990 | Fiedler et al. |
| 5,912,376 A | 6/1999 | Van Der Schaaf et al. |
| 6,407,190 B1 | 6/2002 | Van Der Schaaf et al. |
| 6,683,136 B2 | 1/2004 | Guo et al. |
| 7,470,750 B2 | 12/2008 | Obrecht et al. |
| 7,662,889 B2 | 2/2010 | Obrecht et al. |
| 7,737,233 B2 | 6/2010 | Obrecht et al. |
| 7,875,683 B2 | 1/2011 | Obrecht et al. |
| 8,288,558 B2 | 10/2012 | Arlt et al. |
| 8,394,965 B2 | 3/2013 | Mauduit et al. |
| 8,507,398 B2 | 8/2013 | Meca et al. |
| 8,536,277 B2 | 9/2013 | Mueller et al. |
| 8,536,344 B2 | 9/2013 | Arlt et al. |
| 8,586,757 B2 | 11/2013 | Mauduit et al. |
| 8,609,782 B2 | 12/2013 | Obrecht et al. |
| 9,115,219 B2 | 8/2015 | Obrecht et al. |
| 9,428,592 B2 | 8/2016 | Obrecht et al. |
| 9,593,168 B2 | 3/2017 | Obrecht et al. |
| 2002/0107138 A1 | 8/2002 | Hoveyda et al. |
| 2007/0043180 A1 | 2/2007 | Zhan |
| 2007/0049700 A1 | 3/2007 | Obrecht et al. |
| 2008/0064822 A1* | 3/2008 | Obrecht .................. C08C 19/02 525/338 |
| 2008/0076881 A1 | 3/2008 | Obrecht et al. |
| 2009/0054597 A1 | 2/2009 | Ong et al. |
| 2009/0069516 A1* | 3/2009 | Obrecht ............... B01J 31/1658 526/126 |
| 2009/0076226 A1 | 3/2009 | Meca et al. |
| 2009/0076227 A1 | 3/2009 | Obrecht et al. |

(Continued)

FOREIGN PATENT DOCUMENTS

| CA | 2 048 929 A1 | 2/1992 |
| CA | 2870795 | 10/2013 |

(Continued)

OTHER PUBLICATIONS

Couturier, et al.; "A Cyclometalated Aryloxy(chloro)meopentylidene-tungsten Complex: A Highly Active and Stereoselective Catalyst for the Metathesis of Cis- and trans-2-Pentene, Norbornene, 1-Methyl-norbornene, and Ethyl Oleate" (Angew. Chem. Int. Ed. 31, 628-631 (1992).

Weskamp et al.; "A Novel Class of Ruthenium Catalysts for Olefin Metathesis"; (Angew. Chem. Int. Ed. 37, No. 18, 2490-2493(1998)).

Nicola, et al., "Frist Scale-up to Production Scale of a Ring Closing Matathesis Reaction Forming a 15-Membered Macrocycle as a Precursor of an Active Pharmaceutical Ingredient"; (Organic Process Research & Development 2005, 9, 513-515.

Krause, et al.; "Synthesis an Reactivity of Homogeneous and Heterogeneous Ruthenium Based Metathesis Catalysts Containing Electron-Withdrawing Ligands"; (Chem. Eur. J. 2004, 10, 777-784).

(Continued)

Primary Examiner — Robert C Boyle
(74) Attorney, Agent, or Firm — Norris McLaughlin, P.A.

(57) ABSTRACT

The present invention relates to a process for preparing nitrile rubbers having reduced molecular weight by metathesis of a first nitrile rubber in the presence of specific ruthenium complex catalysts that have particular N-heterocyclic carbene ligands.

7 Claims, No Drawings

(56) References Cited

U.S. PATENT DOCUMENTS

| | | |
|---|---|---|
| 2010/0087600 A1 | 4/2010 | Mueller et al. |
| 2010/0087644 A1 | 4/2010 | Mauduit et al. |
| 2010/0093944 A1 | 4/2010 | Mueller et al. |
| 2010/0113795 A1 | 5/2010 | Arlt et al. |
| 2012/0116026 A1 | 5/2012 | Obrecht et al. |
| 2013/0144060 A1 | 6/2013 | Mauduit et al. |
| 2013/0211096 A1 | 8/2013 | Arlt et al. |
| 2013/0261269 A1 | 10/2013 | Mueller et al. |
| 2013/0345366 A1 | 12/2013 | Obrecht et al. |
| 2014/0066575 A1 | 3/2014 | Obrecht et al. |
| 2015/0307636 A1 | 10/2015 | Obrecht et al. |
| 2015/0344416 A1 | 12/2015 | Dubois et al. |

FOREIGN PATENT DOCUMENTS

| | | | |
|---|---|---|---|
| CN | 101024703 A | 8/2007 | |
| CN | 101372518 A | 2/2009 | |
| CN | 102199311 A | 9/2011 | |
| CN | 103080137 A | 5/2013 | |
| CN | 103974772 A | 8/2014 | |
| CN | 104271607 A | 1/2015 | |
| CN | 104884429 A | 9/2015 | |
| DE | 25 39 132 A1 | 3/1977 | |
| DE | 34 33 392 A1 | 3/1986 | |
| DE | 35 29 252 A1 | 2/1987 | |
| DE | 35 41 689 A1 | 5/1987 | |
| DE | 35 40 918 A1 | 6/1987 | |
| EP | 0 134 023 A1 | 3/1985 | |
| EP | 0 298 386 A2 | 1/1989 | |
| EP | 0 471 250 A1 | 2/1992 | |
| EP | 0 839 821 A2 | 5/1998 | |
| EP | 0 993 465 B1 | 11/2002 | |
| EP | 1 543 875 A1 | 6/2005 | |
| EP | 1 760 093 A2 | 3/2007 | |
| EP | 1 826 220 A2 | 8/2007 | |
| EP | 1 894 946 A2 | 3/2008 | |
| EP | 2 027 919 A2 | 2/2009 | |
| EP | 2 027 920 A1 | 2/2009 | |
| EP | 2 028 194 A1 | 2/2009 | |
| EP | 2 030 988 A1 | 3/2009 | |
| EP | 2 143 489 A1 | 1/2010 | |
| EP | 2 289 622 A1 | 3/2011 | |
| EP | 2 289 623 A1 | 3/2011 | |
| EP | 2 418 225 A1 | 2/2012 | |
| GB | 1 558 491 | 1/1980 | |
| WO | 99/28330 A1 | 6/1999 | |
| WO | 00/15339 A1 | 3/2000 | |
| WO | 00/71554 A2 | 11/2000 | |
| WO | 03/011455 A1 | 2/2003 | |
| WO | 2004/035596 A1 | 4/2004 | |
| WO | 2005/121158 A1 | 12/2005 | |
| WO | 2007/008198 A1 | 1/2007 | |
| WO | 2008/034552 A1 | 3/2008 | |
| WO | 2008/065187 A1 | 6/2008 | |
| WO | 2011/079439 A1 | 7/2011 | |
| WO | 2011/079799 A1 | 7/2011 | |
| WO | 2013/160470 A1 | 10/2013 | |
| WO | 2016/058062 A1 | 4/2016 | |
| WO | WO-2016058062 A1 * | 4/2016 | ............... C08J 11/10 |

OTHER PUBLICATIONS

Katz, et al.; "Stereospecific Polymerizations of Cycloalkenes Induced by a Metal-Carbene"; (Tetrahedron Letter No. 47, 4247-4250 (1976)).

Schaverien, et al.; "A Well-Characterized, Highly Active, Lewis Acid Free Olefin Metathesis Catalyst"; (J. Am. Chem. Soc. 108, 2271-2273 (1986).

Schrock, et al.; "Controlled Ring-Opening Metathesis Polymerization by Molybdenum and Tungsten Alkylidene Complexes"; Journal of Molecular Catalysis, 46, 243-253 (1988).

Schrock, et al.; "Further Studies of Imido Alkylidene Complexes of Tungsten, Well-Characterized Olefin Metathesis Catalysts with Controllable Activity"; Organometallics 9, 2262-2275 (1990).

Harlow, et. al.; "The first co-ordinatively unsaturated Group 8 allenylidene complexes: insights into Grubbs' vs. Dixneuf-Furstner olefin metathesis catalysts"; (J. Chem. Soc. Dalton Trans. 1999, 285-291).

Fuerstner; et al.; "Indenylidene Complexes ofRuthenium: Optimized Synthesis, Structure Elucidation, and Performance as Catalysts for Olefin Metathesis—Application to the Synthesis of the ADE-Ring System of Nakadomarin A"; Chem. Eur. J 2001, 7, No. 22, 4811-4820.

Conrad et al., "The First Highly Active, Halide-Free Ruthenium Catalyst for Olefin Metathesis"; Organometallics 2003, 22, 3634.

Krause et al.; "Stereoselective Cyclopolymerization of Diynes: Smart Materials for Electronics and Sensors" Macromol. Symp. 2004, 217, 179-190.

Dinger, et al.; "High Turnover Numbers with Ruthenium-Based Metathesis Catalysts"; J. C. Adv. Synth. Catal. 2002, 344, 671-677.

Courchay, et l.; "Metathesis Activity and Stability of New Generation Ruthenium Polymerization Catalysts" Macromolecules 2003, 36, 8231, 8239.

Barbasiewicz, et al.; "A Missing Relative: A Hoveyda-Grubbs Metathesis Catalyst Bearing a Peri-Substituted Naphthalene Framework"; Organometallics 2012, 31, 3171-3177.

Yee, et al.; "Efficient Large-Scale Synthesis of BILN 2061, a Potent HCV Protease Inhibitor, by a Convergent Approach Based on Ring-Closing Metathesis"; J. Org. Chem. 2006, 71, 7133-7145.

European Search Report for corresponding application dated Jun. 2018.

Written_Opinion of the International Searching Authority and English Translation dated Mar. 18, 2019.

* cited by examiner

PROCESS FOR PRODUCING NITRILE RUBBERS USING RUTHENIUM COMPLEX CATALYSTS

This application is a 371 of PCT/EP2018/083643, filed Dec. 5, 2018, which claims foreign priority benefit under 35 U.S.C. § 119 of the European Patent Application No. 17206071.7, filed Dec. 8, 2017, the disclosures of which patent applications are incorporated herein by reference.

The present invention relates to a process for preparing nitrile rubbers having reduced molecular weight by metathesis of a first nitrile rubber in the presence of specific ruthenium complex catalysts that have particular N-heterocyclic carbene ligands and particular bridged carbene ligands having at least one electron-withdrawing radical.

Metathesis reactions are used extensively in the context of chemical syntheses, for example in the form of ring-closing metatheses (RCM), cross-metatheses (CM), ring-opening metatheses (ROM), ring-opening metathesis polymerizations (ROMP), cyclic diene metathesis polymerizations (ADMET), self-metatheses, reaction of alkenes with alkynes (ene-yne reactions), polymerizations of alkynes and olefinization of carbonyls. Metathesis reactions are employed, for example, for olefin synthesis, for ring-opening polymerization of norbornene derivatives, for depolymerization of unsaturated polymers and for synthesis of telechelics.

A wide variety of different catalysts based on titanium, tungsten, molybdenum, ruthenium and osmium are available for the catalysis of these reactions, and these have been described in the literature, for example by Katz (Tetrahedron Lett. 47, 4247-4250 (1976)), Bassett (Angew. Chem. Int. Ed. 31, 628-631 (1992)), Schrock (J. Am. Chem. Soc. 108, 2271-2273 (1986); Catal. 46, 243-253 (1988); Organometallics 9, 2262-2275 (1990)), Grubbs (WO-A-00/71554; WO-A-2007/08198; WO-A-03/011455), Herrmann (Angew. Chem. Int. Ed. 37, 2490-2493 (1998)), Hoveyda (US-A-2002/0107138), Hill-Fürstner (J. Chem. Soc. Dalton Trans. 1999, 285-291; Chem. Eur. J 2001, 7, No. 22, 4811-4820), Fogg (Organometallics 2003, 22, 3634), Buchmeiser-Nuyken (Macromol. Symp. 2004, 217, 179-190; Chem. Eur. J. 2004, 10, 777-784), Nolan (WO-A-00/15339), Dixneuf (WO 1999/28330), Mol (J. C. Adv. Synth. Catal. 2002, 344, 671-677), Wagener (Macromolecules 2003, 36, 8231, 8239), Piers (WO-A-2005/121158), Grela (WO-A-2004/035596), Barbasiewicz (Organometallics 2012, 31, 3171-3177), Mauduit (WO-A-2008/065187), Arlt (WO-A-2008/034552), Berke (EP-A-2027920), Zhan (US-A-2007/0043180, WO-A-2011/079439), and by Ciba Special Chemicals (EP-A-0993465; EP-A-0839821) and Böhringer Ingelheim (Org. Process Res. Dev. 2005, 9, 513; J. Org. Chem. 2006, 71 7133).

The catalysts described are suitable to different degrees for the different aforementioned metathesis reactions. The abovementioned catalysts are not necessarily suitable for the catalysis of metathesis reactions of substrates having polar groups, especially of nitrile groups, since only very few metathesis catalysts tolerate polar groups. In the metathesis of nitrile rubber, the selection of suitable catalysts is restricted further in that nitrile rubber which is prepared on the industrial scale by emulsion polymerization contains not only the nitrile groups but also process-specific impurities, for example initiators, redox systems, chain transfer agents, fatty acids or antioxidants, which act as catalyst poisons. A further difficulty or risk is that nitrile rubber gelates readily, causing the polymer to become insoluble and further restricting the fields of use. Furthermore, the polymer can no longer be well-mixed and the result is defects in the end product.

Catalysts that are suitable in principle for the metathesis of nitrile rubber and fulfil the abovementioned criteria to different degrees are described, for example, in EP-A-1826220, WO-A-2008/034552, EP-A-2027920, EP-A-2028194, EP-A-2289622 and EP-A-2289623 and WO-A-2011/079799.

EP-A-1826220 describes transition metal-carbene complex catalysts of the Grubbs-Hoveyda II type for the metathesis of nitrile rubber, having the following general structure (I):

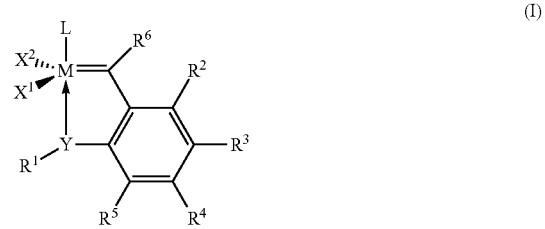

in which

M is ruthenium or osmium,

Y is oxygen (O), sulfur (S), an N—$R^1$ radical or a P—$R^1$ radical, where $R^1$ has the definitions given hereinafter, $X^1$ and $X^2$ represent identical or different ligands, $R^1$ represents an alkyl, cycloalkyl, alkenyl, alkynyl, aryl, alkoxy, alkenyloxy, alkynyloxy, aryloxy, alkoxycarbonyl, alkylamino, alkylthio, arylthio, alkylsulfonyl or alkylsulfinyl radical, all of which may each optionally be substituted by one or more alkyl, halogen, alkoxy, aryl or heteroaryl radicals, $R^2$, $R^3$, $R^4$ and $R^5$ are the same or different and represent hydrogen or organic or inorganic radicals, $R^6$ is hydrogen or an alkyl, alkenyl, alkynyl or aryl radical and L is a ligand.

In the catalysts of the general formula (I), L is a ligand, typically a ligand having electron donor function. L may represent a $P(R^7)_3$ radical where $R^7$ is independently $C_1$-$C_6$-alkyl, $C_3$-$C_8$-cycloalkyl or aryl, or else an optionally substituted imidazolidine radical ("Im").

The imidazolidine radical (Im) typically has a structure of the general formula (IIa) or (IIb)

in which

R[8], R[9], R[10], R[11] are the same or different and are hydrogen, straight-chain or branched $C_1$-$C_{30}$-alkyl, preferably $C_1$-$C_{20}$-alkyl, $C_3$-$C_{20}$-cycloalkyl, preferably $C_3$-$C_{10}$-cycloalkyl, $C_2$-$C_{20}$-alkenyl, preferably $C_2$-$C_{10}$-alkenyl, $C_2$-$C_{20}$-alkynyl, preferably $C_2$-$C_{10}$-alkynyl, $C_6$-$C_{24}$-aryl, preferably $C_6$-$C_{14}$-aryl, $C_1$-$C_{20}$-carboxylate, preferably $C_1$-$C_{10}$-carboxylate, $C_1$-$C_{20}$-alkoxy, preferably $C_1$-$C_{10}$-alkoxy, $C_2$-$C_{20}$-alkenyloxy, preferably $C_2$-$C_{10}$-alkenyloxy, $C_2$-$C_{20}$-alkynyloxy, preferably $C_2$-$C_{10}$-alkynyloxy, $C_6$-$C_{20}$-aryloxy, preferably $C_6$-$C_{14}$-aryloxy, $C_2$-$C_{20}$-alkoxycarbonyl, preferably $C_2$-$C_{10}$-alkoxycarbonyl, $C_1$-$C_{20}$-alkylthio, preferably $C_1$-$C_{10}$-alkylthio, $C_6$-$C_{20}$-arylthio, preferably $C_6$-$C_{14}$-arylthio, $C_1$-$C_{20}$-alkylsulfonyl, preferably $C_1$-$C_{10}$-alkylsulfonyl, $C_1$-$C_{20}$-alkylsulfonate, preferably $C_1$-$C_{10}$-alkylsulfonate, $C_6$-$C_{20}$-arylsulfonate, preferably $C_6$-$C_{14}$-arylsulfonate, and $C_1$-$C_{20}$-alkylsulfinyl, preferably $C_1$-$C_{10}$-alkylsulfinyl.

Particularly preferred imidazolidine radicals (Im) have the following structures (IIIa-IIIf), where Mes in each case is a 2,4,6-trimethylphenyl radical:

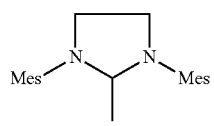
(IIIa)

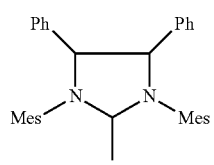
(IIIe)

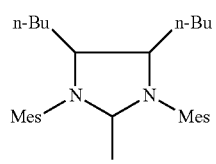
(IIIe)

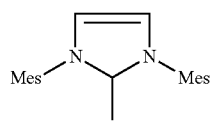
(IIIb)

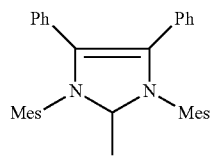
(IIId)

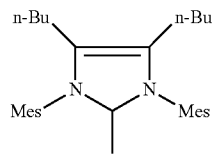
(IIIf)

Catalysts described explicitly are those of the following structure where Mes in each case is 2,4,6-trimethylphenyl:

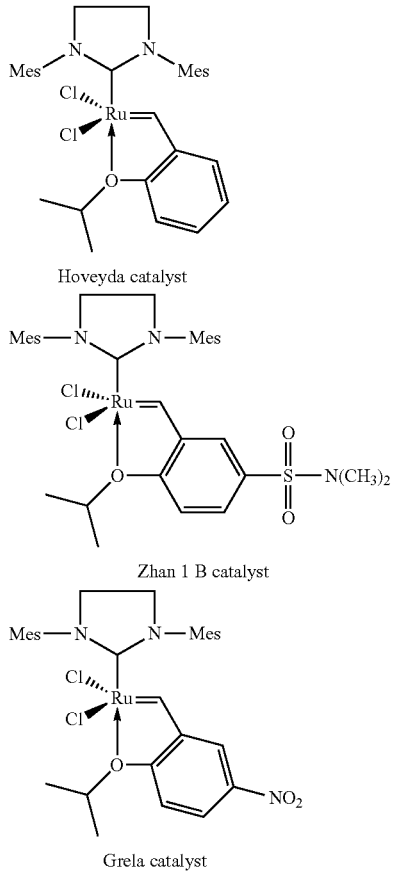

Hoveyda catalyst

Zhan 1 B catalyst

Grela catalyst

Catalysts of the Hoveyda type enable the cross-metathesis of nitrile rubber in the presence of 1-olefins with Ru inputs in the range from 8.6 ppm to 161 ppm based on nitrile rubber. In the range of Ru inputs of 8.6 to 23.8 ppm, the Hoveyda catalyst and the Grela catalyst have higher activities than the Grubbs II catalyst (G II) at the same Ru dosage. The teaching of EP-A-1826220 does not reveal what structural features catalysts have to have in order that their efficiency in the metathesis of nitrile rubber can be further improved. More particularly, there is a lack of details as to the design of the NHC substituent and the aromatic carbene ligand.

EP-A-2028194 describes catalysts having the following general structural features:

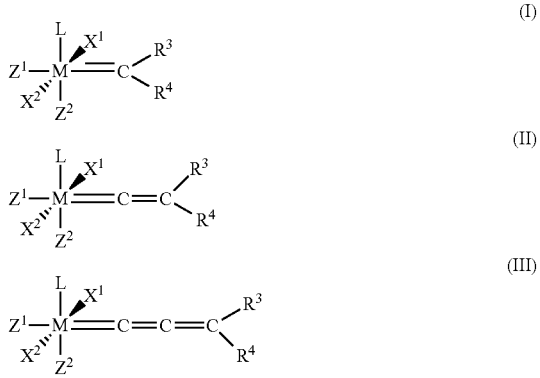

(I)

(II)

(III)

with explicit mention of the following catalysts:

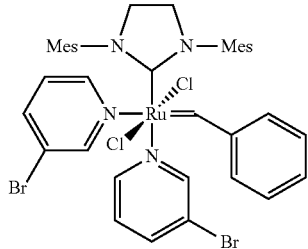
(VII)

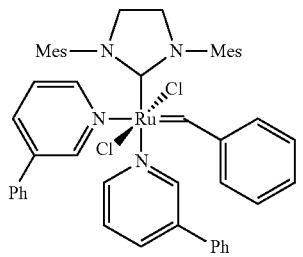
(VIII)

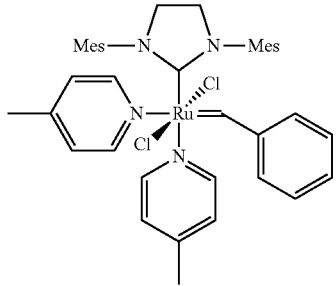
(IX)

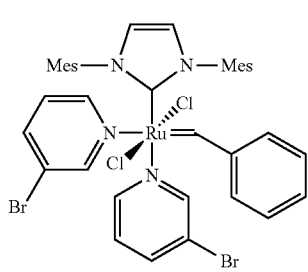
(X)

Given comparable Ru dosages, these catalysts have higher activity than the Grubbs II catalyst.

A disadvantage of the catalysts described in EP-A-2028194 for the metathesis of nitrile rubber is that the catalyst activities are too low for commercial utilization.

EP-A-2027920 describes transition metal-carbene complex catalysts having the following structural features:

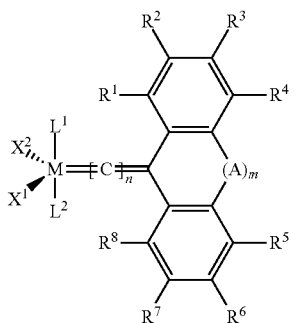
(IIa)

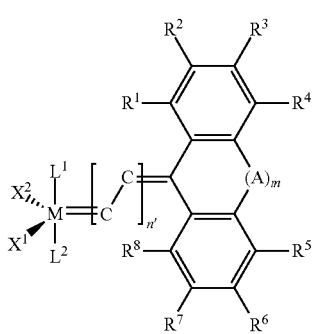
(IIb)

with explicit mention of the following fluorenylidene complex catalysts:

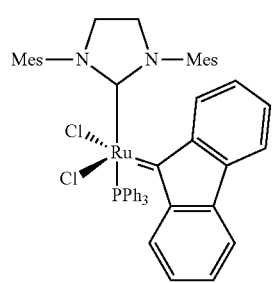
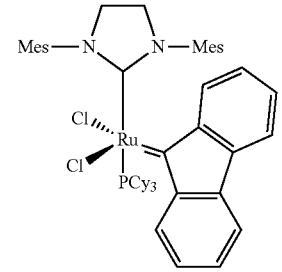

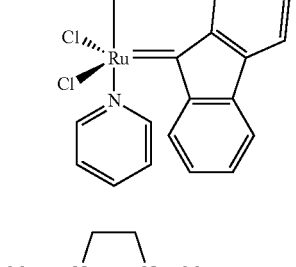

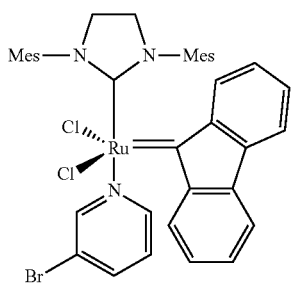

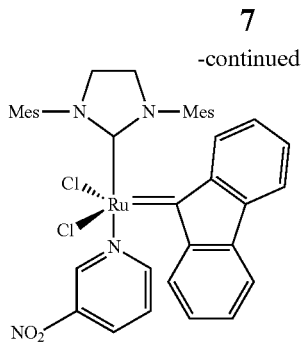

The fluorenylidene complexes have a broad spectrum of use and can be used for a wide variety of different metathesis reactions including nitrile rubber degradation. However, their activity is insufficient for the metathesis of nitrile rubbers.

The Arlt catalyst described in WO-A-2008/034552 is used in EP-A-2289622 for the metathesis of nitrile rubber.

Arlt catalyst

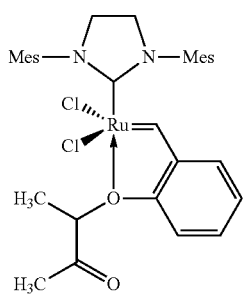

In EP-A-2289622 and EP-A-2289623, the Arlt catalyst is compared at three dosage amounts of 0.003 phr, 0.007 phr and 0.15 phr with the Grubbs II catalyst. In the 6 experiments, the nitrile rubber degradation is conducted as a cross-metathesis in the presence of 4 phr of 1-hexene. By comparison with the Grubbs II catalyst, the Arlt catalyst gives smaller molar masses ($M_w$ and $M_n$) than with the Grubbs II catalyst. EP-A-2289622 does not compare the activity of the Arlt catalyst with that of the Grubbs-Hoveyda II catalyst (GH II), which is known from EP-A-1826220 to have a higher activity than the Grubbs II catalyst. Moreover, the teaching of EP-A-2289622 does not reveal how the chemical structure of a metathesis catalyst should be varied in order for it to have a higher activity than the Grubbs-Hoveyda catalyst in nitrile rubber metathesis.

WO-A-2011/079799 describes numerous catalysts with monodentate N- and bidentate N- and O-containing ligand systems, where the ligands are bonded in each case to the carbon carbene in o position of the aromatic system. The use of these catalysts is described for the performance of RCM and ROMP, but there is a lack of comparisons with known catalysts, and so no relative assessment of the catalyst activities is possible. Furthermore, the metathesis and the hydrogenation of double bond-containing rubbers such as nitrile rubber (NBR), styrene/butadiene rubber (SPR and SBS) and butyl rubber (IIR) are mentioned, it being possible to conduct metathesis and hydrogenation either sequentially or simultaneously. Examples are disclosed for the metathesis of commercially available nitrile rubber and for simultaneous metathesis and hydrogenation. The metathesis is conducted without use of 1-olefins within the temperature range from 30° C. to 100° C. in chloroform or chlorobenzene, using 0.04% by weight, 0.07% by weight and 0.1% by weight of catalyst 4aa. The simultaneous metathesis and hydrogenation is conducted using catalyst 4ab with the same amounts of catalyst.

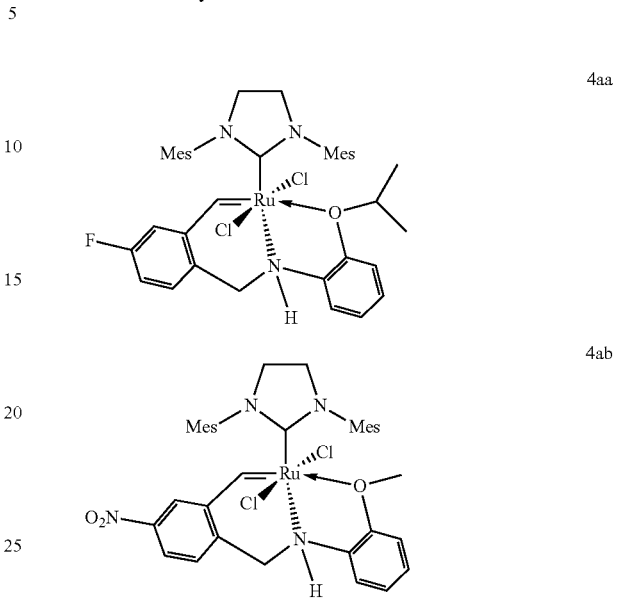

On the basis of the details in WO-A-2011/079799, no predictions can be made in relation to optimization of the ligand system with regard to metathesis reactions and more particularly to metathesis of nitrile rubbers.

The catalysts described for metathesis in the abovementioned patent specifications are tolerant to nitrile rubbers and the impurities present in the nitrile rubber. However, the activity of these catalysts is inadequate from an economic point of view.

WO-A-2008/065187 describes substituted catalysts of the Grubbs-Hoveyda II type with the following structural features (called "Mauduit catalysts" hereinafter):

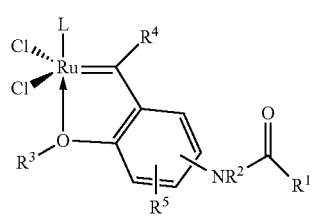

Mauduit Catalyst in which

L is an uncharged ligand

X and X' represent anionic ligands $R^1$ and $R^2$ are independently H, $C_1$-$C_6$-alkyl, perhalogenated $C_1$-$C_6$-alkyl, an aldehyde, ketone, ester, amide, nitrile, optionally substituted aryl, pyridinium-alkyl, pyridinium-perhaloalkyl or optionally substituted $C_5$-$C_6$ cyclohexyl, a $C_nH_{2n}Y$ or $C_nF_{2n}Y$ radical with n=1 to 6 and Y represents an ionic group or a radical of one of the formulae

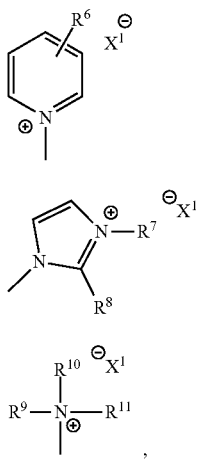

EWG1

EWG2

EWG3

$R^3$ is $C_1$-$C_6$-alkyl or $C_5$-$C_6$-cycloalkyl or $C_5$-$C_6$-aryl, $R^4$, $R^5$, $R^6$, $R^7$, $R^8$, $R^9$, $R^{10}$, $R^{11}$ are independently H, $C_1$-$C_6$-alkyl, $C_1$-$C_6$-perhaloalkyl or $C_5$-$C_6$-aryl, $R^9$, $R^{10}$, $R^{11}$ may form a heterocycle, $X^1$ is an anion, halogen, tetrafluoroborate ($[BF_4]^-$), [tetrakis-(3,5-bis(trifluoromethyl)phenyl)borate]([BARF]$^-$), hexafluorophosphate ($[PF_6]^-$), hexafluoroantimonate ($[SbF_6]^-$), hexafluoroarsenate ($[AsF_6]^-$), trifluoromethyl-sulfonate ($[(CF_3)_2N]^-$);

$R^1$ and $R^2$ together with the N and the C to which they are bonded may form a heterocycle of the formula

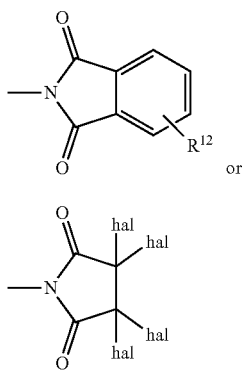

EWG4 or

EWG5 where hal is halogen and $R^{12}$ is hydrogen, $C_1$-$C_6$-alkyl, $C_5$-$C_6$-cycloalkyl or $C_5$-$C_6$-aryl.

In a preferred embodiment, L is $P(R^{13})_3$ where $R^{13}$ is $C_1$-$C_6$-alkyl, $C_5$-$C_6$-aryl or $C_5$-$C_6$-cycloalkyl.

In an alternative preferred embodiment, L is a ligand of the formula 7a, 7b, 7c, 7d or 7e:

7a

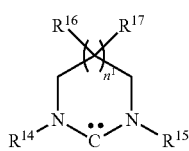

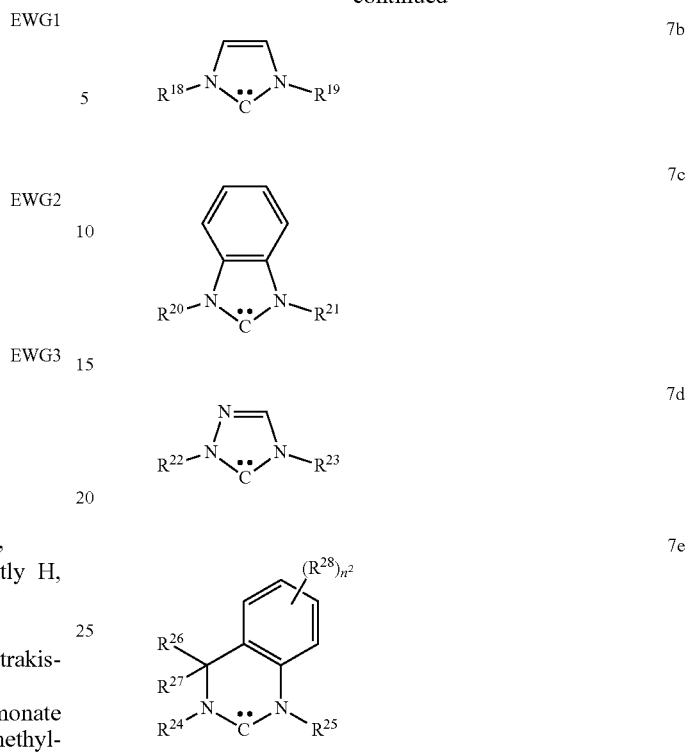

where $n^1 = 0, 1, 2, 3$;

$R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$ are independently $C_1$-$C_6$-alkyl, $C_3$-$C_{20}$-cycloalkyl, $C_2$-$C_{20}$-alkenyl, naphthyl, anthracene or phenyl, where the phenyl may optionally be substituted by up to 5 groups selected from a group comprising $C_1$-$C_6$-alkyl, $C_1$-$C_6$-alkoxy and halogen, $R^{16}$ and $R^{17}$, and $R^{26}$ and $R^{27}$ may form a ring having 3, 4, 5, 6 or 7 bonds, $R^{28}$ may independently form an aromatic ring having 6 bonds.

Selected Mauduit catalysts are, for example,

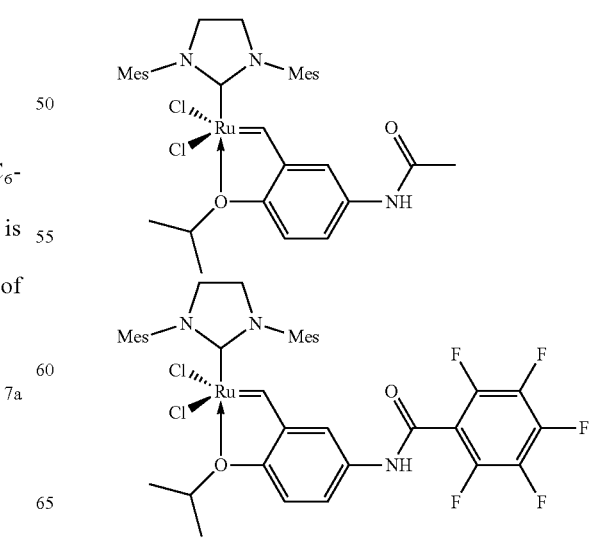

-continued

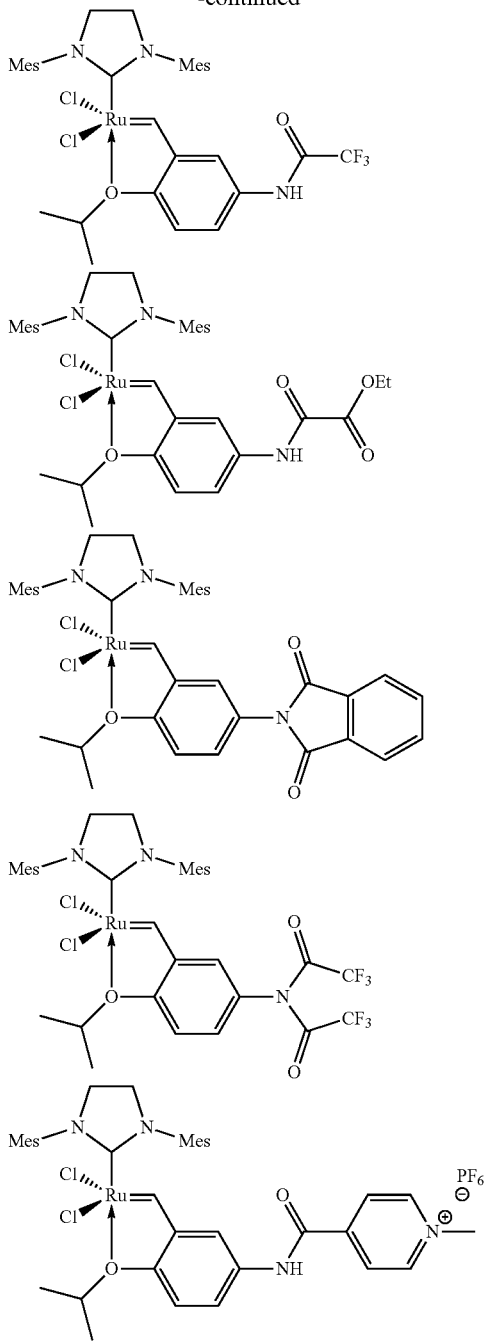

The Mauduit catalysts have the feature of ease of recyclability, which enables the preparation of metathesis products with low precious metal contents. In the most favourable case, the Mauduit catalysts enable the preparation of products having ruthenium contents below 10 ppm to 20 ppm.

According to WO-A-2008/065187, the catalysts described therein are suitable for a number of metathesis reactions, but there is no mention of the metathesis of nitrile rubber. Furthermore, WO-A-2008/065187 lacks pointers for optimization of the catalyst structure, particularly the structure of the NHC ligand, for a reduction in the amount of catalyst in the metathesis of nitrile rubber. WO-A-2008/ 065187 likewise does not contain any pointer as to whether the metathesis reaction of nitrile rubbers can be enhanced by addition of additions.

Furthermore, the patent literature describes a number of additions with which the activity of metathesis catalysts can be enhanced, especially for the metathesis of nitrile rubber (EP-A-1760093, EP-A-1894946, EP-A-2027919, EP-A-2028194, EP-A-2030988, EP-A-2143489, EP-A-2147721).

These patent specifications specify, for the enhancement of activity, the use of salts such as lithium chloride, lithium bromide, magnesium chloride, calcium chloride etc., and of compounds such as boric esters, boron trifluoride-ether adducts, transition metal esters such as tetraalkoxytitanates etc. However, it is not possible to infer from these patent specifications what structural features the ruthenium- or osmium-containing transition metal complex has to have in order for it to have particularly high activities in the metathesis of nitrile rubber.

The problem addressed by the present invention was therefore that of providing a process for the metathesis of nitrile rubbers, especially commercially available nitrile rubbers, based on catalysts which have higher activities than the known catalysts, especially those of the Grubbs II, Grubbs III or Grubbs-Hoveyda II type, and which enable a decrease in molecular weight very substantially without gel formation and without increasing the PDI.

It has been found that, surprisingly, ruthenium complex catalysts having a bridged carbene ligand having at least one electron-withdrawing group (EWG) fulfil the desired requirements in an excellent manner when these ruthenium complex catalysts additionally contain an NHC ligand substituted by two phenyl rings that each have sterically demanding substituents in the o and o' positions.

The problem addressed by the present invention can thus be solved by a process for reducing the molecular weight of nitrile rubber, wherein, in a metathesis reaction, nitrile rubber is contacted with a ruthenium complex catalyst of the general formula (IA)

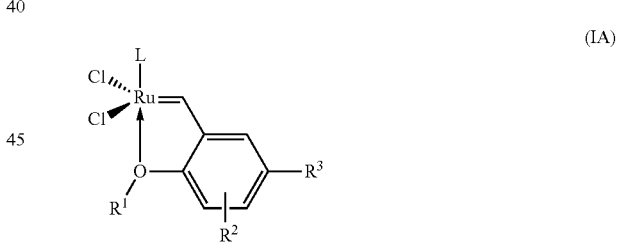

(IA)

where $X^1$ and $X^2$ represent identical or different anionic ligands, preferably halogen, more preferably F, Cl, Br, I and especially preferably Cl, $R^1$ represents a linear or branched, aliphatic $C_1$-$C_{20}$-alkyl, $C_3$-$C_{20}$-cycloalkyl, $C_5$-$C_{20}$-aryl, CHCH$_3$—CO—CH$_3$, preferably methyl, ethyl, isopropyl, isoamyl, t-butyl, CHCH$_3$—CO—CH$_3$, cyclohexyl or phenyl, $R^2$ represents hydrogen, halogen, $C_1$-$C_6$-alkyl or $C_1$-$C_6$-alkenyl, $R^3$ represents an electron-withdrawing radical, preferably —F, —Cl, —Br, —I, —NO, —NO$_2$, —CF$_3$, —OCF$_3$, —CN, —SCN, —NCO, —CNO, —COCH$_3$, —COCF$_3$, —CO—C$_2$F$_5$, —SO$_3$, —SO$_2$—N(CH$_3$)$_2$, arylsulfonyl, arylsulfinyl, arylcarbonyl, alkylcarbonyl, aryloxycarbonyl, or —NR$^4$—CO—R$^5$ where R$^4$ and R$^5$ are the same or different and may each independently be H, $C_1$-$C_6$-alkyl, perhalogenated $C_1$-$C_6$-alkyl, aldehyde, ketone, ester, amide, nitrile, optionally substituted aryl, pyridinium-alkyl, pyridinium-perhaloalkyl or optionally substituted $C_5$-$C_6$ cyclohexyl, a $C_nH_{2n}Y$ or $C_nF_{2n}Y$ radical with n=1 to 6 and Y represents an ionic group or a radical of one of the formulae (EWG 1), (EWG 2) or (EWG 3)

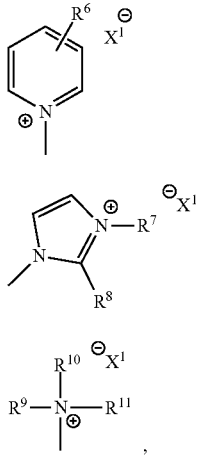

where
$R^6$, $R^7$, $R^8$, $R^9$, $R^{10}$, $R^{11}$ independently represent H, $C_1$-$C_6$-alkyl, $C_1$-$C_6$-perhaloalkyl or $C_5$-$C_6$-aryl and $R^9$, $R^{10}$, $R^{11}$ may form a heterocycle, $X^3$ represents an anion, halogen, tetrafluoroborate ($[BF_4]^-$), [tetrakis-(3,5-bis(trifluoromethyl)phenyl)borate] ($[BARF]^-$), hexafluorophosphate ($[PF_6]^-$), hexafluoroantimonate ($[SbF_6]^-$), hexafluoroarsenate ($[AsF_6]^-$) or trifluoromethylsulfonate ($[(CF_3)_2N]^-$);

$R^4$ and $R^5$ together with the N and the C to which they are bonded may form a heterocycle of the formula (EWG 4) or (EWG 5)

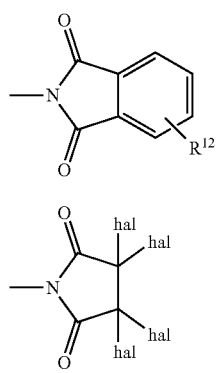

where
hal is halogen and
$R^{12}$ is hydrogen, $C_1$-$C_6$-alkyl, $C_5$-$C_6$-cycloalkyl or $C_5$-$C_6$-aryl,
L represents an NHC ligand of the general formula (L1) or (L2)

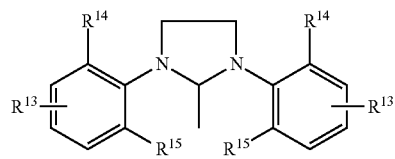

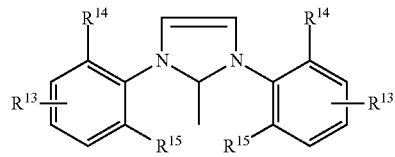

where
$R^{13}$ is hydrogen, $C_1$-$C_6$-alkyl, $C_3$-$C_{30}$-cycloalkyl or $C_5$-$C_{30}$-aryl,
$R^{14}$ and $R^{15}$ are the same or different and are linear or branched $C_3$-$C_{30}$-alkyl, $C_3$-$C_{30}$-cycloalkyl, $C_5$-$C_{30}$-aryl, $C_5$-$C_{30}$-alkaryl, $C_5$-$C_{30}$-aralkyl, with optionally up to 3 heteroatoms, preferably isopropyl, i-butyl, tert-butyl, cyclohexyl or phenyl.

It should be noted at this point that, in the context of the invention, the radical definitions or parameters listed above and below, listed in general terms or within preferred, more preferred, especially preferred and most preferred areas of preference, are also encompassed in any desired combinations with one another.

Preferred NHC ligands are L1a, L2a, L1b, L2b, L1c, L2c, L1d, L2d, L1e and L2e

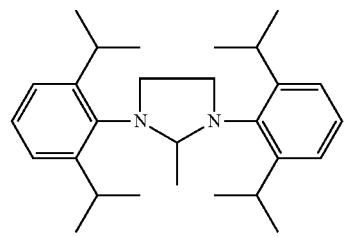

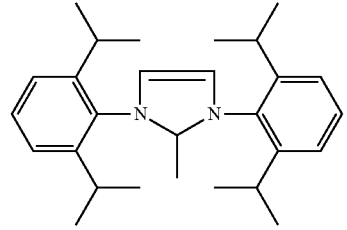

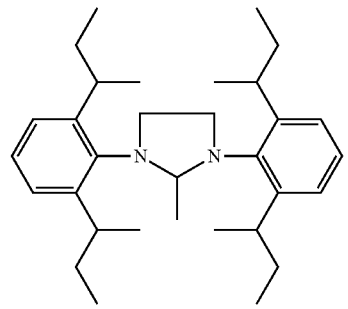

L2b
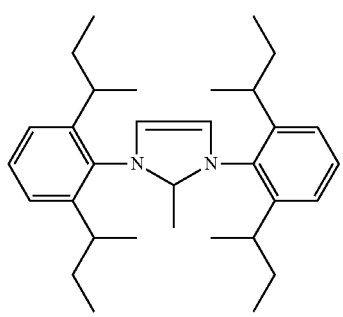

L1c
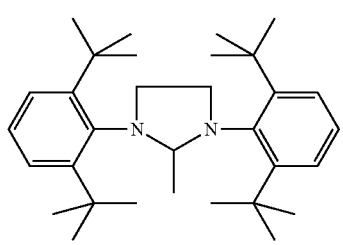

L2c
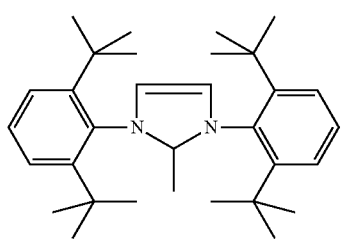

L1d
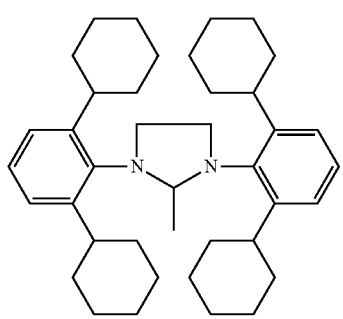

L2d
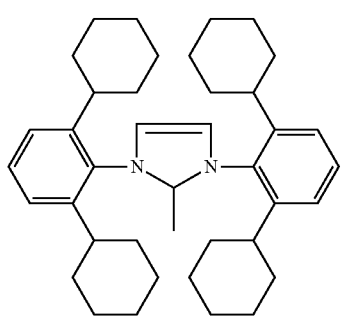

L1e
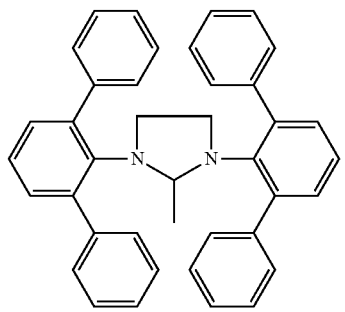

L2e
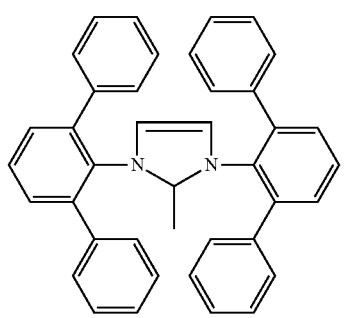

More preferred NHC ligands are L1a, L2a, L1b, L2b, L1c or L2c.

Especially preferred NHC ligands are L1a or L2a.

$R^3$ is preferably —F, —Cl, —Br, —I, —NO, —NO$_2$, —CF$_3$, —OCF$_3$, —CN, —SCN, —NCO, —CNO, —COCH$_3$, —COCF$_3$, —CO—C$_2$F$_5$, —SO$_3$, —SO$_2$N(CH$_3$)$_2$, —NHCO—H, —NH—CO—CH$_3$, —NH—CO—CF$_3$, —NHCO—OEt, —NHCO—OiBu, —NH—CO—COOEt, —CO—NR$_2$, —NH—CO—C$_6$F$_5$, —NH(CO—CF$_3$)$_2$.

$R^3$ is more preferably —Cl, —Br, —NO$_2$, —NH—CO—CF$_3$, —NH—CO-OiBu, —NH—CO—COOEt.

$R^3$ is especially preferably —NH—CO—CF$_3$, —NH—CO-OiBu, NH—CO—COOEt.

Preferred ruthenium complex catalysts are

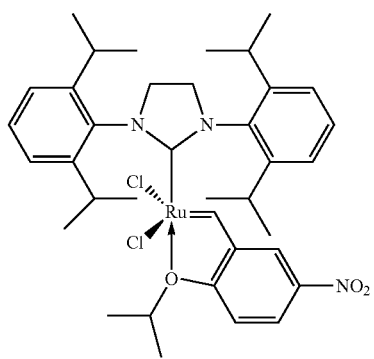

Grela SiPr

-continued

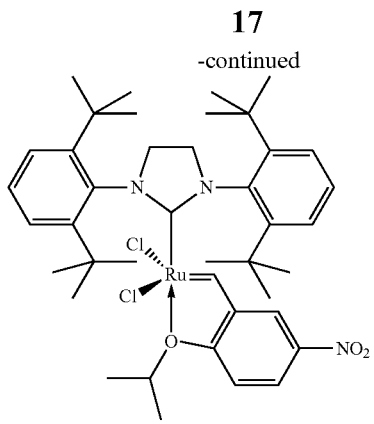

Grela tBut.Phenyl

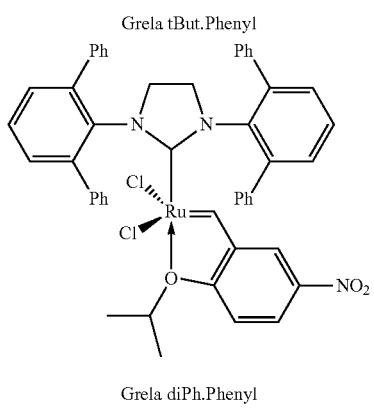

Grela diPh.Phenyl

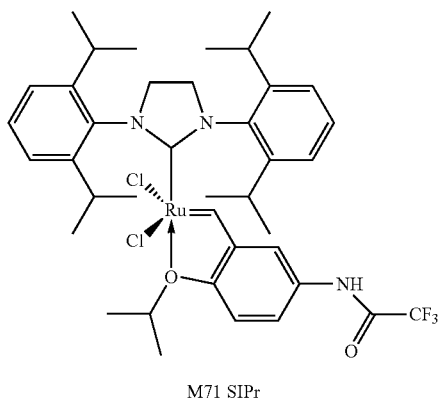

M71 SIPr

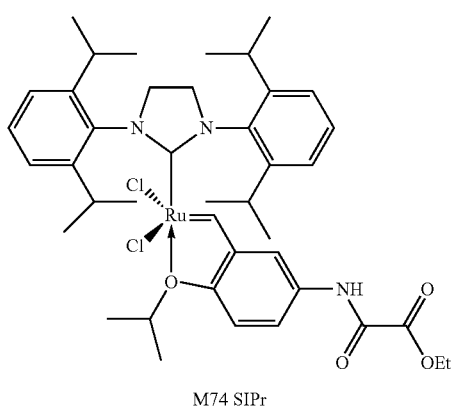

M74 SIPr

-continued

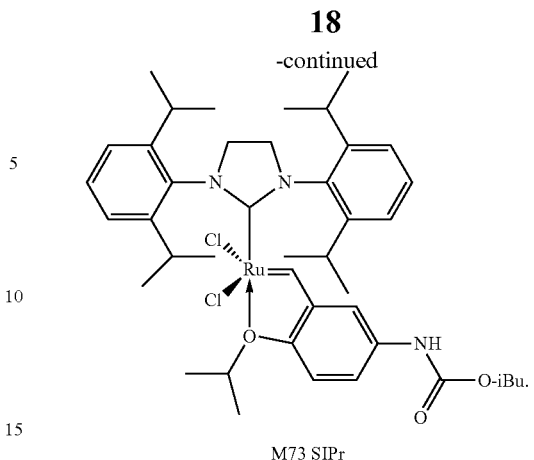

M73 SIPr

More preferred ruthenium complex catalysts are M71 SIPr, M73 SIPr and M74 SIPr.

An especially preferred ruthenium complex catalyst is M73 SIPr.

The amount of the ruthenium complex catalyst of the general formula (IA) or (IB) used, based on the nitrile rubber used, in the molecular weight reduction according to the invention depends on the nature and catalytic activity of the specific ruthenium complex catalyst. The amount of ruthenium complex catalyst used is typically 1 ppm to 1000 ppm of precious metal, preferably 2 ppm to 500 ppm, especially 5 ppm to 250 ppm, based on the nitrile rubber used.

The NBR metathesis can be conducted in the absence or else in the presence of a co-olefin. This co-olefin is preferably a straight-chain or branched $C_2$-$C_{16}$ olefin. Suitable examples are ethylene, propylene, isobutene, styrene, 1-dodecene, 1-hexene or 1-octene. Preference is given to using 1-hexene or 1-octene. If the co-olefin is liquid (like 1-hexene for example), the amount of the co-olefin is preferably within a range from 0.2% by weight to 20% by weight, based on the nitrile rubber used. If the co-olefin is a gas, like ethylene for example, the amount of the co-olefin is chosen so as to establish a pressure in the range from $1 \times 10^5$ Pa to $1 \times 10^7$ Pa in the reaction vessel at room temperature, preferably a pressure in the range from $5.2 \times 10^5$ Pa to $4 \times 10^6$ Pa.

The metathesis reaction can be conducted in a suitable solvent that does not deactivate the catalyst used, nor does it adversely affect the reaction in any other way. Preferred solvents include, but are not limited to, dichloromethane, benzene, toluene, methyl ethyl ketone, acetone, tetrahydrofuran, tetrahydropyran, dioxane, cyclohexane and monochlorobenzene. The particularly preferred solvent is monochlorobenzene. In some cases, when the co-olefin itself can function as solvent, as in the case of 1-hexene for example, it is also possible to dispense with the addition of a further additional solvent.

The concentration of the nitrile rubber used in the reaction mixture for the metathesis is not critical, but it should be noted that the reaction should not be adversely affected by much too high a viscosity of the reaction mixture and the associated mixing problems. Preferably, the concentration of the NBR in the reaction mixture is in the range from 1% by weight to 30% by weight, more preferably in the range from 5% by weight to 25% by weight, based on the overall reaction mixture.

The metathesis degradation is typically conducted at a temperature in the range from 10° C. to 150° C., preferably at a temperature in the range from 20° C. to 100° C.

The reaction time depends on a number of factors, for example on the type of NBR, the type of catalyst, the catalyst concentration used and the reaction temperature. Typically, the reaction has ended within five hours under normal conditions. The progress of the metathesis can be monitored by standard analysis, for example by gel permeation chromatography (GPC) measurements or by determining the viscosity.

Nitrile rubbers ("NBRs") used in the process according to the invention may be co-, ter- or quaterpolymers containing repeat units of at least one conjugated diene, at least one α,β-unsaturated nitrile and optionally one or more further copolymerizable monomers.

Any conjugated diene can be used. Preference is given to using conjugated ($C_4$-$C_6$) dienes. Particular preference is given to 1,3-butadiene, isoprene, 2,3-dimethylbutadiene, piperylene or mixtures thereof. Especially preferred are 1,3-butadiene and isoprene or mixtures thereof. Very particular preference is given to 1,3-butadiene.

The α,β-unsaturated nitrile used may be any known α,β-unsaturated nitrile, preference being given to ($C_3$-$C_5$)-α,β-unsaturated nitriles such as acrylonitrile (ACN), methacrylonitrile, ethacrylonitrile or mixtures thereof. Acrylonitrile is particularly preferred.

A particularly preferred nitrile rubber is thus a copolymer of acrylonitrile and 1,3-butadiene.

As well as the conjugated diene and the α,β-unsaturated nitrile, it is also possible to use one or more further copolymerizable monomers known to those skilled in the art, e.g. α,β-unsaturated mono- or dicarboxylic acids or esters or amides thereof.

Preferred α,β-unsaturated mono- or dicarboxylic acids here are fumaric acid, maleic acid, acrylic acid and methacrylic acid.

Esters of the α,β-unsaturated carboxylic acids used are
alkyl (meth)acrylate, especially $C_1$-$C_{18}$-alkyl (meth)acrylate, preferably n-butyl, tert-butyl, n-pentyl or n-hexyl (meth)acrylate;
alkoxyalkyl (meth)acrylate, especially $C_1$-$C_{18}$-alkoxyalkyl (meth)acrylate, preferably $C_4$-$C_{12}$-alkoxyalkyl (meth)acrylate;
hydroxyalkyl (meth)acrylate, especially $C_1$-$C_{18}$-hydroxyalkyl (meth)acrylate, preferably $C_4$-$C_{12}$-hydroxyalkyl (meth)acrylate;
cycloalkyl (meth)acrylate, especially $C_5$-$C_{18}$-cycloalkyl (meth)acrylate, preferably $C_6$-$C_{12}$-cycloalkyl (meth)acrylate, more preferably cyclopentyl (meth)acrylate, cyclohexyl (meth)acrylate, cycloheptyl (meth)acrylate;
alkylcycloalkyl (meth)acrylate, especially $C_6$-$C_{12}$-alkylcycloalkyl (meth)acrylate, preferably $C_7$-$C_{10}$-alkylcycloalkyl (meth)acrylate, more preferably methylcyclopentyl (meth)acrylate and ethylcyclohexyl (meth)acrylate;
aryl monoesters, especially $C_6$-$C_{14}$-aryl monoesters, preferably phenyl (meth)acrylate or benzyl (meth)acrylate;
amino-containing α,β-ethylenically unsaturated carboxylic esters, for example dimethylaminomethyl acrylate or diethylaminoethyl acrylate;
α,β-ethylenically unsaturated monoalkyl dicarboxylates, preferably
alkyl monoesters, especially $C_4$-$C_{18}$-alkyl monoesters, preferably n-butyl, tert-butyl, n-pentyl or n-hexyl monoesters, more preferably mono-n-butyl maleate, mono-n-butyl fumarate, mono-n-butyl citraconate, mono-n-butyl itaconate, most preferably mono-n-butyl maleate,
alkoxyalkyl monoesters, especially $C_4$-$C_{18}$-alkoxyalkyl monoesters, preferably $C_4$-$C_{12}$-alkoxyalkyl monoesters,
hydroxyalkyl monoesters, especially $C_4$-$C_{18}$-hydroxyalkyl monoesters, preferably $C_4$-$C_{12}$-hydroxyalkyl monoesters,
cycloalkyl monoesters, especially $C_5$-$C_{18}$-cycloalkyl monoesters, preferably $C_6$-$C_{12}$-cycloalkyl monoesters, more preferably monocyclopentyl maleate, monocyclohexyl maleate, monocycloheptyl maleate, monocyclopentyl fumarate, monocyclohexyl fumarate, monocycloheptyl fumarate, monocyclopentyl citraconate, monocyclohexyl citraconate, monocycloheptyl citraconate, monocyclopentyl itaconate, monocyclohexyl itaconate and monocycloheptyl itaconate,
alkylcycloalkyl monoesters, especially $C_6$-$C_{12}$-alkylcycloalkyl monoesters, preferably $C_7$-$C_{10}$-alkylcycloalkyl monoesters, more preferably monomethylcyclopentyl maleate and monoethylcyclohexyl maleate, monomethylcyclopentyl fumarate and monoethylcyclohexyl fumarate, monomethylcyclopentyl citraconate and monoethylcyclohexyl citraconate; monomethylcyclopentyl itaconate and monoethylcyclohexyl itaconate;
aryl monoesters, especially $C_6$-$C_{14}$-aryl monoesters, preferably monoaryl maleates, monoaryl fumarates, monoaryl citraconates or monoaryl itaconates, more preferably monophenyl maleate or monobenzyl maleate, monophenyl fumarate or monobenzyl fumarate, monophenyl citraconate or monobenzyl citraconate, monophenyl itaconate or monobenzyl itaconate,
unsaturated polyalkyl polycarboxylates, for example dimethyl maleate, dimethyl fumarate, dimethyl itaconate or diethyl itaconate.

Mixtures of the aforementioned esters are also usable.

Esters of the α,β-unsaturated carboxylic acids used are preferably the alkyl esters and alkoxyalkyl esters thereof. Particularly preferred alkyl esters of the α,β-unsaturated carboxylic acids are methyl acrylate, ethyl acrylate, butyl acrylate, butyl methacrylate, 2-ethylhexyl acrylate, 2-ethylhexyl methacrylate and octyl acrylate. Particularly preferred alkoxyalkyl esters of the α,β-unsaturated carboxylic acids are methoxyethyl (meth)acrylate and ethoxyethyl (meth)acrylate. Preferred α,β-ethylenically unsaturated carboxylic esters used are also PEG acrylates derived from the general formula (I)

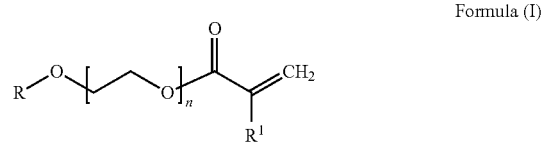

Formula (I)

where
R is unbranched or branched $C_1$-$C_{20}$-alkyl, preferably $C_2$-$C_{20}$-alkyl, more preferably ethyl, butyl or ethylhexyl,
n is 2 to 12, preferably 2 to 8, more preferably 2 to 5 and most preferably 2 or 3 and
$R^1$ is hydrogen or $CH_3$—.

The term "(meth)acrylate" in the context of this invention represents "acrylate" and "methacrylate". When the $R^1$ radical in the general formula (I) is $CH_3$—, the molecule is a methacrylate.

The term "polyethylene glycol" or the abbreviation "PEG" in the context of this invention represents ethylene glycol sections having two repeat ethylene glycol units (PEG-2; n=2) to 12 repeat ethylene glycol units (PEG-2 to PEG-12; n=2 to 12).

The term "PEG acrylate" is also abbreviated to PEG-X-(M)A where "X" is the number of repeat ethylene glycol units, "MA" is methacrylate and "A" is acrylate.

Acrylate units derived from PEG acrylates of general formula (I) are referred to in the context of this invention as "PEG acrylate unit".

Preferred PEG acrylate units are derived from the PEG acrylates having the following formulae no. 1 to no. 8, wherein n is 2, 3, 4, 5, 6, 7, 8, 9, 10, 11 or 12, preferably 2, 3, 4, 5, 6, 7 or 8, more preferably 2, 3, 4 or 5 and most preferably 2 or 3:

(Formula no. 1)

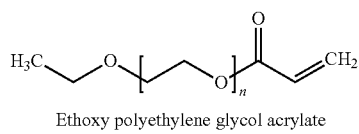

Ethoxy polyethylene glycol acrylate (Formula no. 2)

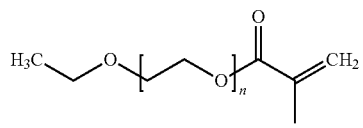

Ethoxy polyethylene glycol methacrylate (Formula no. 3)

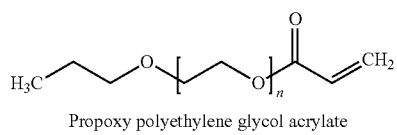

Propoxy polyethylene glycol acrylate (Formula no. 4)

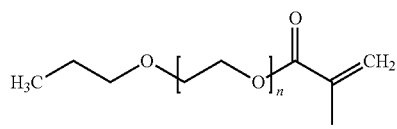

Propoxy polyethylene glycol methacrylate (Formula no. 5)

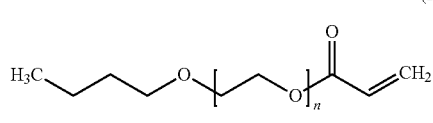

Butoxy polyethylene glycol acrylate (Formula no. 6)

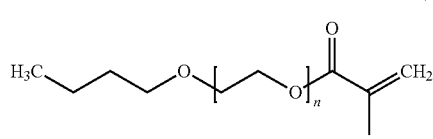

Butoxy polyethylene glycol methacrylate (Formula no. 7)

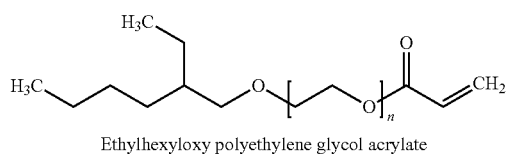

Ethylhexyloxy polyethylene glycol acrylate (Formula no. 8)

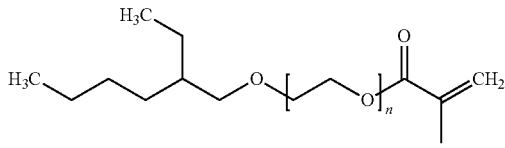

Ethylhexyloxy polyethylene glycol methacrylate

Other commonly used designations for ethoxy polyethylene glycol acrylate (formula no. 1) are for example poly(ethylene glycol) ethyl ether acrylate, ethoxy PEG acrylate, ethoxy poly(ethylene glycol) monoacrylate or poly(ethylene glycol) monoethyl ether monoacrylate.

These PEG acrylates can be purchased commercially, for example from Arkema under the Sartomer® trade name, from Evonik under the Visiomer® trade name, or from Sigma Aldrich.

In a preferred embodiment, the amount of the PEG acrylate units in the nitrile rubber is in the range from 0% to 65% by weight, preferably 20% to 60% by weight and more preferably 20% to 55% by weight, based on the total amount of 100% by weight of all the monomer units.

In an alternative embodiment, the amount of PEG acrylate units in the nitrile rubber is 20% to 60% by weight and the amount of further α,β-ethylenically unsaturated carboxylic ester units other than the PEG acrylate units is 0% to 40% by weight based on the total amount of 100% by weight of all monomer units, wherein the total amount of carboxylic ester units does not exceed 60% by weight.

In an alternative embodiment, the nitrile rubber contains not only the α,β-ethylenically unsaturated nitrile unit, the conjugated diene unit and the PEG acrylate unit derived from a PEG acrylate of general formula (I), but also, as unsaturated carboxylic ester unit, a monoalkyl dicarboxylate unit, preferably monobutyl maleate.

In a preferred nitrile rubber, the α,β-ethylenically unsaturated nitrile unit is derived from acrylonitrile or methacrylonitrile, more preferably from acrylonitrile, the conjugated diene unit is derived from isoprene or 1,3-butadiene, more preferably from 1,3-butadiene, and the α,β-ethylenically unsaturated carboxylic ester unit is exclusively a PEG acrylate unit derived from PEG acrylate of the general formula (I) where n is 2 to 8, more preferably from PEG acrylate of the general formula (I) where n is 2 or 3, where no further carboxylic ester unit is present.

In a further preferred nitrile rubber, the α,β-ethylenically unsaturated nitrile unit is derived from acrylonitrile or methacrylonitrile, more preferably from acrylonitrile, the conjugated diene unit is derived from isoprene or 1,3-butadiene, more preferably from 1,3-butadiene, and the α,β-ethylenically unsaturated carboxylic ester unit is derived from a first PEG acrylate of the general formula (I) where n is 2 to 12, more preferably from PEG acrylate of the general formula (I) where n is 2 or 3 and an α,β-ethylenically unsaturated carboxylic ester unit other than the PEG acrylate units.

In addition, the nitrile rubber may contain one or more further copolymerizable monomers in an amount of 0% by weight to 20% by weight, preferably 0.1% by weight to 10% by weight, based on the total amount of 100% by weight of all monomer units. In that case, the amounts of the other monomer units are reduced in a suitable manner, such that the sum total of all monomer units is always 100% by weight. The nitrile rubber may contain, as further copolymerizable monomers, one or more
- aromatic vinyl monomers, preferably styrene, α-methylstyrene and vinylpyridine,
- fluorine-containing vinyl monomers, preferably fluoroethyl vinyl ether, fluoropropyl vinyl ether, o-fluoromethylstyrene, vinyl pentafluorobenzoate, difluoroethylene and tetrafluoroethylene, or else
- α-olefins, preferably $C_2$-$C_{12}$ olefins, for example ethylene, 1-butene, 4-butene, 4-methyl-1-pentene, 1-hexene or 1-octene,
- non-conjugated dienes, preferably $C_4$-$C_{12}$ dienes such as 1,4-pentadiene, 1,4-hexadiene, 4-cyanocyclohexene, 4-vinylcyclohexene, vinylnorbornene, dicyclopentadiene or else
- alkynes such as 1- or 2-butyne,
- α,β-ethylenically unsaturated monocarboxylic acids, preferably acrylic acid, methacrylic acid, crotonic acid or cinnamic acid,
- α,β-ethylenically unsaturated dicarboxylic acids, preferably maleic acid, fumaric acid, citraconic acid, itaconic acid,
- copolymerizable antioxidants, for example N-(4-anilinophenyl)acrylamide, N-(4-anilinophenyl)methacrylamide, N-(4-anilinophenyl)cinnamide, N-(4-anilinophenyl)crotonamide, N-phenyl-4-(3-vinylbenzyloxy)aniline, N-phenyl-4-(4-vinylbenzyloxy)aniline or
- crosslinkable monomers, for example divinyl components such as divinylbenzene for example.

In an alternative embodiment, the nitrile rubber contains, as PEG acrylate units, ethoxy, butoxy or ethylhexyloxy polyethylene glycol (meth)acrylate comprising 2 to 12 repeat ethylene glycol units, more preferably ethoxy or butoxy polyethylene glycol (meth)acrylate comprising 2 to 5 repeat ethylene glycol units and most preferably ethoxy or butoxy polyethylene glycol (meth)acrylate comprising 2 or 3 repeat ethylene glycol units.

In a further alternative embodiment of the nitrile rubber, n is 2 or 3, R is ethyl or butyl and $R^1$ is hydrogen or methyl, preferably n is 2, R is butyl and $R^1$ is methyl.

In a further alternative embodiment, the nitrile rubber includes 8% to 18% by weight of acrylonitrile units, 27% to 65% by weight of 1,3-butadiene units and 27% to 55% by weight of PEG-2 acrylate units or PEG-3 acrylate units.

In a further alternative embodiment, the nitrile rubber contains
- 13% to 17% by weight of α,β-ethylenically unsaturated nitrile unit, preferably acrylonitrile,
- 36% to 44% by weight of the conjugated diene unit, preferably 1,3-butadiene, and
- 43% to 47% by weight of PEG acrylate unit, derived from a PEG acrylate of general formula (I), preferably butoxy diethylene glycol methacrylate.

The proportions of conjugated diene and α,β-unsaturated nitrile in the NBR polymers to be used may vary within wide ranges. The proportion of, or of the sum total of, the conjugated diene(s) is typically in the range from 40% by weight to 90% by weight, preferably in the range from 55% by weight to 85% by weight, based on the overall polymer. The proportion of, or of the sum total of, the α,β-unsaturated nitrile(s) is typically in the range from 10% by weight to 60% by weight, preferably 15% by weight to 45% by weight, based on the overall polymer. The proportions of the monomers in each case add up to 100% by weight. The additional monomers may be present in amounts of 0% by weight to 40% by weight, preferably 0.1% by weight to 65% by weight, more preferably 1% by weight to 30% by weight, based on the overall polymer. In this case, corresponding proportions of the conjugated diene(s) and/or of the α,β-unsaturated nitrile(s) are replaced by the proportions of the additional monomers, where the proportions of all monomers in each case add up to 100% by weight.

The preparation of the nitrile rubbers by polymerization of the aforementioned monomers is sufficiently well-known to the person skilled in the art and extensively described in the literature (for example in W. Hofmann, Rubber Chem. Technol. 36 (1963).

Nitrile rubbers that can be used in the manner of the invention are also commercially available, for example as products from the product series of the Perbunan® and Krynac® brands from ARLANXEO Deutschland GmbH.

The nitrile rubbers used for metathesis have a Mooney viscosity (ML 1+4 at 100° C.) in the range from 30 to 100, preferably from 30 to 50. This corresponds to a weight-average molecular weight Mw in the range from 150 000 g/mol to 500 000 g/mol, preferably in the range from 180 000 g/mol to 400 000 g/mol. The nitrile rubbers used also have a polydispersity PDI=Mw/Mn, where Mw is the weight-average and Mn the number-average molecular weight, in the range from 2.0 to 8.0 and preferably in the range from 2.0 to 6.0.

The Mooney viscosity is determined here to ASTM Standard D 1646.

The nitrile rubbers obtained by the metathesis process according to the invention have a Mooney viscosity (ML 1+4 at 100° C.) in the range from 5 to 35, preferably in the range from 5 to 25. This corresponds to a weight-average molecular weight Mw in the range from 10 000 g/mol to 150 000 g/mol, preferably in the range from 10 000 g/mol to 100 000 g/mol. The nitrile rubbers obtained also have a polydispersity PDI=Mw/Mn, where Mn is the number-average molecular weight, in the range from 1.4 to 4.0, preferably in the range from 1.5 to 3.0.

The present invention further provides for the use of the ruthenium complex catalysts in metathesis reactions for metathesis of nitrile rubbers. The metathesis reactions may, for example, be ring-closing metatheses (RCM), cross-metatheses (CM) or else ring-opening metatheses (ROMP). Typically, for this purpose, the nitrile rubber is contacted and reacted with the ruthenium complex catalyst.

The use according to the invention is a process for reducing the molecular weight of the nitrile rubber by contacting the nitrile rubber with the ruthenium complex catalyst. This reaction is a cross-metathesis.

The metathesis degradation in the presence of the catalyst system according to the invention may be followed by a hydrogenation of the degraded nitrile rubbers obtained. This can be effected in a manner known to the person skilled in the art.

It is possible to conduct the hydrogenation using homogeneous or heterogeneous hydrogenation catalysts. It is also possible to conduct the hydrogenation in situ, i.e. in the same reaction mixture in which the metathesis degradation has also been effected beforehand and without the need to isolate the degraded nitrile rubber. The hydrogenation catalyst is simply added to the reaction vessel.

The catalysts used are based typically on rhodium, ruthenium or titanium, but it is also possible to use platinum, iridium, palladium, rhenium, ruthenium, osmium, cobalt or copper, either as the metal or else preferably in the form of metal compounds (see, for example, A-3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. Nos. 4,464,515 and 4,503,196).

Suitable catalysts and solvents for a hydrogenation in homogeneous phase are described hereinafter and are also known from DE-A-2539132 and EP-A-0471250.

Selective hydrogenation can be achieved, for example, in the presence of a rhodium or ruthenium catalyst. It is possible to use, for example, a catalyst of the general formula

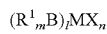

in which M is ruthenium or rhodium, $R^1$ is the same or different and is a $C_1$-$C_8$ alkyl group, a $C_4$-$C_8$ cycloalkyl group, a $C_6$-$C_{15}$ aryl group or a $C_7$-$C_{15}$ aralkyl group, B is phosphorus, arsenic, sulfur or a sulfoxide group S=O, X is hydrogen or an anion, preferably halogen and more preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulfoxide)rhodium(III) chloride, and also tetrakis(triphenylphosphine)rhodium hydride of the formula $((C_6H_5)_3P)_4RhH$ and the corresponding compounds in which the triphenylphosphine has been replaced fully or partly by tricyclohexylphosphine. The catalyst can be used in small amounts. An amount in the range from 0.01% to 1% by weight, preferably in the range from 0.03% to 0.5% by weight and more preferably in the range from 0.05% to 0.3% by weight, based on the weight of the polymer, is suitable.

It is typically advisable to use the catalyst together with a co-catalyst which is a ligand of the formula $R^1{}_m B$ where $R^1$, m and B are each as defined above for the catalyst. Preferably, m is 3, B is phosphorus and the $R^1$ radicals may be the same or different. The co-catalysts preferably have trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicycloalkyl monoaryl radicals.

Examples of co-catalysts can be found, for example, in U.S. Pat. No. 4,631,315. A preferred co-catalyst is triphenylphosphine. Preferably, in addition, the weight ratio of the rhodium catalyst to the co-catalyst is in the range from 1:1 to 1:55, more preferably in the range from 1:3 to 1:30. Based on 100 parts by weight of the nitrile rubber to be hydrogenated, in a suitable manner, 0.1 to 33 parts by weight of the co-catalyst, preferably 0.2 part by weight to 20 parts by weight and even more preferably 0.5 part by weight to 5 parts by weight, especially more than 0.9 part by weight but less than 5 parts by weight, of co-catalyst are used, based on 100 parts by weight of the nitrile rubber to be hydrogenated.

The practical conduct of this hydrogenation is sufficiently well-known to those skilled in the art from U.S. Pat. No. 6,683,136. It is typically effected by contacting the nitrile rubber to be hydrogenated with hydrogen in a solvent such as toluene or monochlorobenzene at a temperature in the range from 100° C. to 150° C. and a pressure in the range from 5 MPa to 15 MPa for 2 hours to 10 hours.

Hydrogenation is understood in the context of this invention to mean a conversion of the double bonds present in the starting nitrile rubber to an extent of at least 50%, preferably 70% to 100%, more preferably 80% to 100%. Particular preference is also given to residual contents of double bonds in the HNBR of 0% to 8%.

When heterogeneous catalysts are used, these are typically supported catalysts based on palladium, which are supported, for example, on charcoal, silica, calcium carbonate or barium sulfate.

On completion of the hydrogenation, a hydrogenated nitrile rubber is obtained that has a Mooney viscosity (ML 1+4 @ 100° C.), measured to ASTM Standard D 1646, in the range from 1 to 50. This corresponds roughly to a weight-average molecular weight Mw in the range from 2000 to 400 000 g/mol. Preferably, the Mooney viscosity (ML 1+4 @ 100° C.) is in the range from 5 to 40. This corresponds roughly to a weight-average molecular weight Mw in the range from about 20 000 to 200 000 g/mol. The hydrogenated nitrile rubbers obtained also have a polydispersity PDI=Mw/Mn, where Mw is the weight-average and Mn the number-average molecular weight, in the range from 1 to 5 and preferably in the range from 1.5 to 3.

EXAMPLES

I Description of the Analysis Methods

Gel Permeation Chromatography (GPC) Procedure:

The molecular weight $M_n$ and $M_w$ is calculated by means of the Waters Empower 2 Data Base Software, and determined using the following equipment: A Shimadzu LC-20AT high performance liquid chromatography (HPLC) pump, an SFD S5200 autosampler, 3 PLgel 10 μm Mixed-B columns (300×7.5 mm ID), a Shodex RI-71 detector, an ERC column oven. The GPC experiments were conducted at 40° C. and a flow rate of 1 ml/min with tetrahydrofuran (THF) as eluent. The GPC column was calibrated with standard polystyrene (PS) samples.

Determination of the Residual Double Bond ("RDB") Content:

The RDB in % is determined by means of the following FT-IR method: The spectrum of the nitrile rubber is recorded before, during and after the hydrogenation reaction by means of a Thermo Nicolet FT-IR spectrometer of the AVATAR 360 type. The NBR solution in monochlorobenzene was applied to an NaCl disc and dried in order to obtain a film for the analysis. The hydrogenation rate is determined by means of the FT-IR analysis according to ASTM Standard D 5670-95.

Determination of Mooney Viscosity:

The determination of the Mooney viscosity is determined by the method of ASTM Standard D 1646. The Mooney viscosity ML 1+4 @ 100° C. was measured at 100° C. with a preheating time of one minute and measurement time of 4 minutes.

Determination of Brookfield Viscosity:

The solution viscosity of a polymer solution in MCB is determined with a Brookfield LV DV II+ rotary viscometer. The measurements were conducted with a 62 standard spindle in a 400 ml beaker filled with 250 ml of polymer solution at a temperature of 23±0.1° C.

II Materials Used

Table 1 summarizes the non-inventive catalysts used in the examples described hereinafter (Grubbs II, Grubbs-Hoveyda II, Zhan 1B, M71 SIMes and M73 SIMes).

Table 2 summarizes the inventive catalysts used in the examples described hereinafter (M71 SIPr, M73 SIPr, M74 SIPr).

TABLE 1

| | Non-inventive catalysts used | | |
|---|---|---|---|
| Catalyst name | Structural formula | Molecular weight [g/mol] | Source |
| Grubbs II catalyst (G II) | | 848.33 | Materia/Pasadena; USA |
| Grubbs-Hoveyda II catalyst (GH II) | | 626.14 | Aldrich |
| Zhan 1B | | 733.75 | Strem Chemicals |
| M71 SIMes | | 737.64 | Umicore |
| M73 SIMes | | 741.75 | Umicore |

TABLE 2

Inventive catalysts used

| Catalyst name | Structural formula | Molecular weight [g/mol] | Source |
|---|---|---|---|
| M71 SIPr | 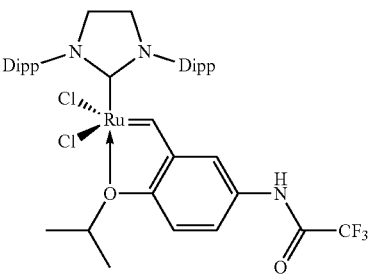 | 821.80 | Umicore |
| M73 SIPr | 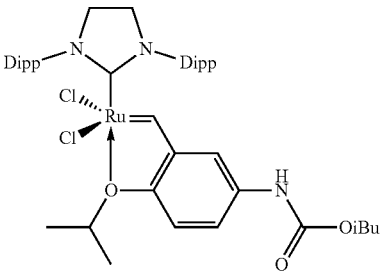 | 825.91 | Umicore |
| M74 SIPr | 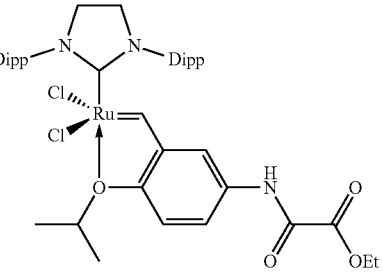 | 825.87 | Umicore |

Legend:
Ph in each case represents a phenyl radical.
Dipp in each case represents a diisopropylphenyl radical.
Mes in each case represents a 2,4,6-trimethylphenyl radical.

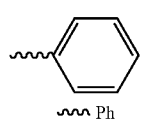 Ph

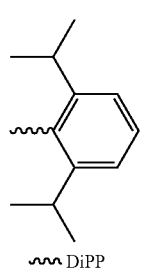 DiPP

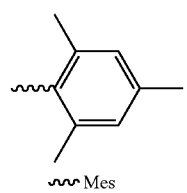 Mes

Nitrile Rubbers Used

The examples described hereinafter were conducted using different NBR and HNBR grades from ARLANXEO Deutschland GmbH. These nitrile rubbers had the characteristic indices shown in Table 3.

TABLE 3

Nitrile rubbers used

| Nitrile rubber | Acrylonitrile-content (ACN) [% by wt.] | Mooney value (ML 1 + 4 @ 100° C.) [MU] | Molecular weight $M_w$ [kg/mol] | Molecular weight $M_n$ [kg/mol] | PDI | RDB |
|---|---|---|---|---|---|---|
| NBR-1 | 34 | 30 | 250 | 75 | 3.4 | 100 |
| NBR-2 | 34 | 30 | 252 | 75 | 3.4 | 100 |

TABLE 3-continued

Nitrile rubbers used

| Nitrile rubber | Acrylonitrile-content (ACN) [% by wt.] | Mooney value (ML 1 + 4 @ 100° C.) [MU] | Molecular weight $M_w$ [kg/mol] | Molecular weight $M_n$ [kg/mol] | PDI | RDB |
|---|---|---|---|---|---|---|
| NBR-3 | 34 | 30 | 273 | 75 | 3.7 | 100 |
| NBR-4 | 34 | 30 | 251 | 74 | 3.4 | 100 |
| NBR-5 | 34 | 30 | 240 | 71 | 3.4 | 100 |
| NBR-6 | 34 | 30 | 266 | 73 | 3.6 | 100 |
| NBR-7 | 34 | 35 | 263 | 75 | 3.5 | 100 |
| NBR-8 | 34 | 30 | — | — | — | 100 |
| HNBR | 34 | 68 | 283 | 83 | 3.4 | 5.5 |

PDI = $M_w/M_n$;
MU = Mooney units

TABLE 4

Additions used

| Addition | Structural formula | Molecular weight [g/mol] | Source |
|---|---|---|---|
| Lithium bromide | LiBr | 86.85 | Aldrich |
| Lithium chloride | LiCl | 42.39 | Fluka |
| Magnesium chloride | MgCl$_2$ | 95.21 | Fluka |
| Calcium chloride | CaCl$_2$ | 110.98 | Aldrich |
| Triisopropyl borate | (OiPr)$_3$B | 188.07 | Aldrich |
| Titanium isopropoxide | Ti(OiPr)$_4$ | 284.22 | Aldrich |

III Metathesis Reactions

Table 5 gives an overview of the inventive examples and the corresponding non-inventive reference examples, the inventive examples being identified by "*".

In Examples 1a to 8b* and 12* to 17*, the nitrile rubber degradation was conducted in the form of a cross-metathesis with additions of 1-hexene. Both in the inventive examples and in the corresponding reference examples, the catalysts were used in such amounts as to result in ruthenium inputs of 9 ppm and 18 ppm in each case.

In Examples 9, 10* and 11, the nitrile rubber degradation was conducted in the form of a self-metathesis without additions of 1-hexene. These examples were conducted with ruthenium inputs of 67 ppm.

In Examples 17* and 18, the metathesis of partly hydrogenated nitrile rubber was conducted. The metathesis was conducted without additions of 1-olefin (self-metathesis) with ruthenium inputs of 151 ppm and at 100° C.

TABLE 5

Overview of the experiments conducted (* = inventive experiments)

| No. | NBR type | Catalyst Type | Amount [mmol] | Ru [ppm] | Addition Type | Amount [phr] | Amount of 1-hexene [phr] | T [° C.] | Mn (24 h) [kg/mol] | Mw (24 h) [kg/mol] |
|---|---|---|---|---|---|---|---|---|---|---|
| 1a | NBR-1 | G II | 0.0066 | 9 | — | — | 4 | 22 | 59 | 161 |
| 1b | NBR-1 | G II | 0.0133 | 18 | — | — | 4 | 22 | 48 | 116 |
| 2a | NBR-2 | GH II | 0.0066 | 9 | — | — | 4 | 22 | 54 | 145 |
| 2b | NBR-2 | GH II | 0.0133 | 18 | — | — | 4 | 22 | 45 | 107 |
| 3a | NBR-2 | Zhan 1B | 0.0066 | 9 | — | — | 4 | 22 | 54 | 157 |
| 3b | NBR-2 | Zhan 1B | 0.0133 | 18 | — | — | 4 | 22 | 45 | 106 |
| 4a | NBR-3 | M71 SIMes | 0.0066 | 9 | — | — | 4 | 22 | 62 | 187 |
| 4b | NBR-3 | M71 SIMes | 0.0133 | 18 | — | — | 4 | 22 | 50 | 135 |
| 5a* | NBR-4 | M71 SIPr | 0.0067 | 9 | — | — | 4 | 22 | 42 | 99 |
| 5b* | NBR-4 | M71 SIPr | 0.0134 | 18 | — | — | 4 | 22 | 28 | 62 |
| 6a | NBR-5 | M73 SIMes | 0.0066 | 9 | — | — | 4 | 22 | 56 | 157 |
| 6b | NBR-5 | M73 SIMes | 0.0132 | 18 | — | — | 4 | 22 | 43 | 101 |
| 7a* | NBR-5 | M73 SIPr | 0.0066 | 9 | — | — | 4 | 22 | 41 | 95 |
| 7b* | NBR-5 | M73 SIPr | 0.0132 | 18 | — | — | 4 | 22 | 27 | 56 |
| 8a* | NBR-4 | M74 SIPr | 0.0067 | 9 | — | — | 4 | 22 | 43 | 106 |
| 8b* | NBR-4 | M74 SIPr | 0.0133 | 18 | — | — | 4 | 22 | 30 | 61 |
| 9 | NBR-6 | M73 SIMes | 0.0500 | 67 | — | — | 0 | 22 | 60 | 164 |
| 10* | NBR-6 | M73 SIPr | 0.0500 | 67 | — | — | 0 | 22 | 52 | 124 |

TABLE 5-continued

Overview of the experiments conducted (* = inventive experiments)

| No. | NBR type | Catalyst Type | Catalyst Amount [mmol] | Catalyst Ru [ppm] | Addition Type | Addition Amount [phr] | Amount of 1-hexene [phr] | T [° C.] | Mn (24 h) [kg/mol] | Mw (24 h) [kg/mol] |
|---|---|---|---|---|---|---|---|---|---|---|
| 11 | NBR-6 | GH II | 0.0500 | 67 | — | — | 0 | 22 | 56 | 145 |
| 12* | NBR-3 | M71 SIPr | 0.0066 | 9 | LiBr | 1.8 | 4 | 22 | 23 | 50 |
| 13* | NBR-3 | M73 SIPr | 0.0066 | 9 | Ti(O iPr)$_4$ | 0.039 | 4 | 22 | 35 | 81 |
| 14* | NBR-3 | M73 SIPr | 0.0132 | 18 | MgCl$_2$ | 0.65 | 4 | 22 | 23 | 49 |
| 15* | NBR-3 | M71 SIPr | 0.0066 | 9 | CaI$_2$ | 0.5 | 4 | 22 | 32 | 68 |
| 16* | NBR-3 | M73 SIPr | 0.0132 | 18 | LiCl | 0.65 | 4 | 22 | 10 | 22 |
| 17* | HNBR | M73 SIPr | 0.0750 | 151 | — | — | 0 | 100 | 71 | 186 |
| 18 | HNBR | GH II | 0.0750 | 151 | — | — | 0 | 100 | 73 | 195 |

G II = Grubbs II catalyst;
GH II = Grubbs-Hoveyda II catalyst;

Procedure for the Metathesis Reactions

All metathesis reactions were conducted in solution using monochlorobenzene (from Aldrich), called "MCB" hereinafter. Prior to use, the MCB was distilled and inertized by passing nitrogen through it at room temperature. The amounts of nitrile rubber noted in the tables which follow were dissolved in MCB at room temperature with agitation over a period of 12 hours. The additions (olefins) noted in the tables were added to the rubber-containing solution and stirred for 2 hours for homogenization. For experiments with additions, the additions were added at this point and the rubber-containing solution was stirred for another 1 hour. Prior to the addition of catalyst, the rubber solutions in monochlorobenzene were heated to the temperatures noted in the tables. Reaction mixtures 1 to 11 were designed such that the rubber concentration after addition of catalyst was 15% by weight; reaction mixtures 12 and 13 were designed such that the rubber concentration after addition of catalyst was 10% by weight.

The metathesis catalysts (see Table 1) were each dissolved in 1 ml (0.0066 mmol of catalyst) or 2 ml (0.013 mM of catalyst) of MCB and added immediately to the nitrile rubber solutions. The addition of catalyst started the metathesis reactions, and they were monitored at regular time intervals (1 hour, 3 hours, 24 hours) by measuring the average molecular weight by means of gel permeation chromatography. The samples (5 ml each time) taken to determine the molecular weight were immediately stopped by addition of 0.8 ml of ethyl vinyl ether. The viscosities of the end samples (after a reaction time of 24 hours) were also determined in solution with the aid of a Brookfield viscometer (measurement temperature: 21° C.).

Inventive Examples and Comparative Examples

Examples 1a and b: Reaction of NBR with Grubbs II Catalyst

| Rubber | | | |
|---|---|---|---|
| Name | ACN content [% by wt.] | ML1 + 4 (100° C.) [MU] | Amount [g] |
| NBR-1 | 34 | 30 | 75.15 |

| Reaction conditions | | | | | | |
|---|---|---|---|---|---|---|
| Catalyst | | | | Co-olefin | | Temperature [° C.] |
| No. | Type | Amount [mg] | Amount [mmol] | Ru based on NBR [ppm] | Type | Amount [phr] | |
| 1a | Grubbs II | 5.6 | 0.0066 | 9 | 1-hexene | 4 | 22 |
| 1b | | 11.2 | 0.0133 | 18 | 1-hexene | 4 | 22 |

| | Example 1a Reaction time [h] | | | | Example 1b Reaction time [h] | | | |
|---|---|---|---|---|---|---|---|---|
| Analytical data | 0 | 1 | 3 | 24 | 0 | 1 | 3 | 24 |
| M$_w$ [kg/mol] | 250 | 174 | 161 | 161 | 252 | 133 | 116 | 116 |
| M$_n$ [kg/mol] | 75 | 62 | 59 | 59 | 75 | 53 | 48 | 48 |
| PDI | 3.4 | 2.8 | 2.7 | 2.8 | 3.4 | 2.5 | 2.4 | 2.4 |
| Viscosity [mPa*s] | 2434 | — | — | 603 | 2434 | — | — | 271 |
| Viscosity/M$_w$ [Pa*s*mol/kg] | 0.0101 | — | — | 0.0044 | 0.0101 | — | — | 0.0030 |

Examples 2a and b: Reaction of NBR with Grubbs-Hoveyda II Catalyst

| Rubber | | | |
|---|---|---|---|
| Name | ACN content [% by wt.] | ML1 + 4 (100° C.) [MU] | Amount [g] |
| NBR-2 | 34 | 30 | 75.05 |

| Reaction conditions | | | | | | | |
|---|---|---|---|---|---|---|---|
| Catalyst | | | | | Co-olefin | | Temperature [° C.] |
| No. | Type | Amount [mg] | Amount [mmol] | Ru based on NBR [ppm] | Type | Amount [phr] | |
| 2a | Grubbs- | 5.9 | 0.0066 | 9 | 1-hexene | 4 | 22 |
| 2b | Hoveyda II | 11.7 | 0.0133 | 18 | 1-hexene | 4 | 22 |

| | Example 2a Reaction time [h] | | | | Example 2b Reaction time [h] | | | |
|---|---|---|---|---|---|---|---|---|
| Analytical data | 0 | 1 | 3 | 24 | 0 | 1 | 3 | 24 |
| $M_w$ [kg/mol] | 252 | 145 | 145 | 145 | 252 | 107 | 107 | 107 |
| $M_n$ [kg/mol] | 75 | 55 | 55 | 54 | 75 | 45 | 45 | 45 |
| PDI | 3.4 | 2.6 | 2.7 | 2.7 | 3.4 | 2.4 | 2.4 | 2.4 |
| Viscosity [mPa*s] | 2774 | — | — | 623 | 2774 | — | — | 293 |
| Viscosity/$M_w$ [Pa*s*mol/kg] | 0.0110 | — | — | 0.0043 | 0.0110 | — | — | 0.0027 |

Examples 3a and b: Reaction of NBR with Zhan 1B Catalyst

| Rubber | | | |
|---|---|---|---|
| Name | ACN content [% by wt.] | ML1 + 4 (100° C.) [MU] | Amount [g] |
| NBR-2 | 34 | 30 | 75.05 |

| Reaction conditions | | | | | | | |
|---|---|---|---|---|---|---|---|
| Catalyst | | | | | Co-olefin | | ° C. |
| No. | Type | Amount [mg] | Amount [mmol] | Ru based on NBR [ppm] | Type | Amount [phr] | |
| 3a | Zhan | 4.9 | 0.0066 | 9 | 1-hexene | 4 | 22 |
| 3b | 1B | 9.7 | 0.0133 | 18 | 1-hexene | 4 | 22 |

|  | Example 3a Reaction time [h] | | | | Example 3b Reaction time [h] | | | |
|---|---|---|---|---|---|---|---|---|
| Analytical data | 0 | 1 | 3 | 24 | 0 | 1 | 3 | 24 |
| $M_w$ [kg/mol] | 252 | 156 | 156 | 157 | 252 | 106 | 106 | 106 |
| $M_n$ [kg/mol] | 75 | 54 | 55 | 54 | 75 | 44 | 44 | 45 |
| PDI | 3.4 | 2.9 | 2.8 | 2.9 | 3.4 | 2.4 | 2.4 | 2.3 |
| Viscosity [mPa*s] | 2774 | – | – | 697 | 2774 | – | – | 282 |
| Viscosity/$M_w$ [Pa*s*mol/kg] | 0.0110 | – | – | 0.0044 | 0.0110 | – | – | 0.0027 |

Examples 4a and b: Reaction of NBR with M71 SIMes Catalyst

| Rubber | | | |
|---|---|---|---|
| Name | ACN content [% by wt.] | ML1 + 4 (100° C.) [MU] | Amount [g] |
| NBR-3 | 34 | 30 | 75.00 |

| Reaction conditions | | | | | | |
|---|---|---|---|---|---|---|
| Catalyst | | | | Co-olefin | | |
| No. | Type | Amount [mg] | Amount [mmol] | Ru based on NBR [ppm] | Type | Amount [phr] | Temperature [° C.] |
| 4a | M71 | 4.9 | 0.0066 | 9 | 1-hexene | 4 | 22 |
| 4b | SIMes | 9.8 | 0.0133 | 18 | 1-hexene | 4 | 22 |

|  | Example 4a Reaction time [h] | | | | Example 4b Reaction time [h] | | | |
|---|---|---|---|---|---|---|---|---|
| Analytical data | 0 | 1 | 3 | 24 | 0 | 1 | 3 | 24 |
| $M_w$ [kg/mol] | 273 | – | – | 187 | 273 | – | – | 135 |
| $M_n$ [kg/mol] | 75 | – | – | 62 | 75 | – | – | 50 |
| PDI | 3.7 | – | – | 3.0 | 3.7 | – | – | 2.7 |
| Viscosity [mPa*s] | 2959 | – | – | 907 | 2959 | – | – | 409 |
| Viscosity/$M_w$ [Pa*s*mol/kg] | 0.0108 | – | – | 0.0049 | 0.0108 | – | – | 0.0030 |

Examples 5a* and b*: Reaction of NBR with M71 SIPr Catalyst

| Rubber | | | |
|---|---|---|---|
| Name | ACN content [% by wt.] | ML1 + 4 (100° C.) [MU] | Amount [g] |
| NBR-4 | 34 | 30 | 75.00 |

| Reaction conditions | | | | | | |
|---|---|---|---|---|---|---|
| Catalyst | | | | Co-olefin | | |
| No. | Type | Amount [mg] | Amount [mmol] | Ru based on NBR [ppm] | Type | Amount [phr] | Temperature [° C.] |
| 5a* | M71 | 5.5 | 0.0066 | 9 | 1-hexene | 4 | 22 |
| 5b* | SIPr | 11.0 | 0.0133 | 18 | 1-hexene | 4 | 22 |

| Analytical data | Example 5a Reaction time [h] | | | | Example 5b Reaction time [h] | | | |
|---|---|---|---|---|---|---|---|---|
| | 0 | 1 | 3 | 24 | 0 | 1 | 3 | 24 |
| $M_w$ [kg/mol] | 251 | 104 | 100 | 99 | 251 | 66 | 63 | 62 |
| $M_n$ [kg/mol] | 74 | 43 | 42 | 42 | 74 | 29 | 28 | 28 |
| PDI | 3.4 | 2.4 | 2.4 | 2.4 | 3.4 | 2.2 | 2.2 | 2.2 |
| Viscosity [mPa*s] | 2519 | – | – | 215 | 2519 | – | – | 83 |
| Viscosity/$M_w$ [Pa*s*mol/kg] | 0.0100 | – | – | 0.0022 | 0.0100 | – | – | 0.0029 |

Examples 6a and b: Reaction of NBR with M73 SIMes Catalyst

| Rubber | | | |
|---|---|---|---|
| Name | ACN content [% by wt.] | ML1 + 4 (100° C.) [MU] | Amount [g] |
| NBR-5 | 34 | 30 | 75.05 |

| Reaction conditions | | | | | | |
|---|---|---|---|---|---|---|
| | Catalyst | | | | Co-olefin | |
| No. | Type | Amount [mg] | Amount [mmol] | Ru based on NBR [ppm] | Type | Amount [phr] | Temperature [° C.] |
| 6a | M73 | 4.9 | 0.0066 | 9 | 1-hexene | 4 | 22 |
| 6b | SIMes | 9.8 | 0.0132 | 18 | 1-hexene | 4 | 22 |

| Analytical data | Example 6a Reaction time [h] | | | | Example 6b Reaction time [h] | | | |
|---|---|---|---|---|---|---|---|---|
| | 0 | 1 | 3 | 24 | 0 | 1 | 3 | 24 |
| $M_w$ [kg/mol] | 240 | 158 | 158 | 157 | 240 | 102 | 102 | 101 |
| $M_n$ [kg/mol] | 71 | 56 | 57 | 56 | 71 | 42 | 44 | 43 |
| PDI | 3.4 | 2.8 | 2.8 | 2.8 | 3.4 | 2.4 | 2.3 | 2.4 |
| Viscosity [mPa*s] | 2437 | – | – | 681 | 2437 | – | – | 224 |
| Viscosity/$M_w$ [Pa*s*mol/kg] | 0.0102 | – | – | 0.0043 | 0.0102 | – | – | 0.0022 |

Examples 7a* and b*: Reaction of NBR with M73 SIPr Catalyst

| Rubber | | | |
|---|---|---|---|
| Name | ACN content [% by wt.] | ML1 + 4 (100° C.) [MU] | Amount [g] |
| NBR-5 | 34 | 30 | 75.05 |

| Reaction conditions | | | | | | | |
|---|---|---|---|---|---|---|---|
| | Catalyst | | | | Co-olefin | | |
| No. | Type | Amount [mg] | Amount [mmol] | Ru based on NBR [ppm] | Type | Amount [phr] | Temperature [° C.] |
| 7a* | M73 | 5.5 | 0.0066 | 9 | 1-hexene | 4 | 22 |
| 7b* | SIPr | 10.9 | 0.0132 | 18 | 1-hexene | 4 | 22 |

| Analytical data | Example 7a Reaction time [h] | | | | Example 7b Reaction time [h] | | | |
|---|---|---|---|---|---|---|---|---|
| | 0 | 1 | 3 | 24 | 0 | 1 | 3 | 24 |
| $M_w$ [kg/mol] | 240 | 98 | 97 | 95 | 240 | 60 | 57 | 56 |
| $M_n$ [kg/mol] | 71 | 41 | 40 | 41 | 71 | 28 | 27 | 27 |
| PDI | 3.4 | 2.4 | 2.4 | 2.3 | 3.4 | 2.2 | 2.1 | 2.1 |
| Viscosity [mPa*s] | 2437 | – | – | 190 | 2437 | – | – | 63 |
| Viscosity/$M_w$ [Pa*s*mol/kg] | 0.0103 | – | – | 0.0020 | 0.0102 | – | – | 0.0011 |

Examples 8a* and b*: Reaction of NBR with M74 SIPr Catalyst

| Rubber | | | |
|---|---|---|---|
| Name | ACN content [% by wt.] | ML1 + 4 (100° C.) [MU] | Amount [g] |
| NBR-4 | 34 | 30 | 75.00 |

| Reaction conditions | | | | | | |
|---|---|---|---|---|---|---|
| Catalyst | | | | Co-olefin | | Temperature [° C.] |
| No. | Type | Amount [mg] | Amount [mmol] | Ru based on NBR [ppm] | Type | Amount [phr] | |
| 8a* | M74 | 5.5 | 0.0067 | 9 | 1-hexene | 4 | 22 |
| 8b* | SIPr | 11.0 | 0.0133 | 18 | 1-hexene | 4 | 22 |

| Analytical data | Example 8a Reaction time [h] | | | | Example 8b Reaction time [h] | | | |
|---|---|---|---|---|---|---|---|---|
| | 0 | 1 | 3 | 24 | 0 | 1 | 3 | 24 |
| $M_w$ [kg/mol] | 251 | 110 | 106 | 106 | 251 | 63 | 61 | 61 |
| $M_n$ [kg/mol] | 74 | 45 | 44 | 43 | 74 | 31 | 30 | 30 |
| PDI | 3.4 | 2.5 | 2.4 | 2.4 | 3.4 | 2.1 | 2.1 | 2.1 |
| Viscosity [mPa*s] | 2519 | — | — | 261 | 2519 | — | — | 75 |
| Viscosity/$M_w$ [Pa*s*mol/kg] | 0.0100 | — | — | 0.0025 | 0.0100 | — | — | 0.0025 |

Example 9: Reaction of NBR with M73 SIMes Catalyst without Olefin

| Rubber | | | |
|---|---|---|---|
| Name | ACN content [% by wt.] | ML1 + 4 (100° C.) [MU] | Amount [g] |
| NBR-6 | 34 | 30 | 75.00 |

Reaction conditions

| | | Catalyst | | | |
|---|---|---|---|---|---|
| No. | Type | Amount [mg] | Amount [mmol] | Ru based on NBR [ppm] | Temperature [° C.] |
| 9 | M73 SIMes | 37.1 | 0.0500 | 67 | 22 |

| | Example 9 Reaction time [h] | |
|---|---|---|
| Analytical data | 0 | 24 |
| $M_w$ [kg/mol] | 266 | 164 |
| $M_n$ [kg/mol] | 73 | 60 |
| PDI | 3.6 | 2.8 |
| Viscosity [mPa*s] | 2599 | 895 |
| Viscosity/$M_w$ [Pa*s*mol/kg] | 0.0098 | 0.0062 |

Example 10*: Reaction of NBR with M73 SIPr Catalyst without Olefin

Rubber

| Name | ACN content [% by wt.] | ML1 + 4 (100° C.) [MU] | Amount [g] |
|---|---|---|---|
| NBR-6 | 34 | 30 | 75.00 |

Reaction conditions

| | | Catalyst | | | |
|---|---|---|---|---|---|
| No. | Type | Amount [mg] | Amount [mmol] | Ru based on NBR [ppm] | Temperature [° C.] |
| 10* | M73 SIPr | 41.3 | 0.0500 | 67 | 22 |

| | Example 10 Reaction time [h] | |
|---|---|---|
| Analytical data | 0 | 24 |
| $M_w$ [kg/mol] | 266 | 124 |
| $M_n$ [kg/mol] | 73 | 52 |
| PDI | 3.6 | 2.4 |
| Viscosity [mPa*s] | 2599 | 360 |
| Viscosity/$M_w$ [Pa*s*mol/kg] | 0.0098 | 0.0029 |

Example 11: Reaction of NBR with Grubbs-Hoveyda II Catalyst without Olefin

Rubber

| Name | ACN content [% by wt.] | ML1 + 4 (100° C.) [MU] | Amount [g] |
|---|---|---|---|
| NBR-6 | 34 | 30 | 75.00 |

Reaction conditions

| | | Catalyst | | | |
|---|---|---|---|---|---|
| No. | Type | Amount [mg] | Amount [mmol] | Ru based on NBR [ppm] | Temperature [° C.] |
| 11 | Grubbs-Hoveyda II | 44.2 | 0.0500 | 67 | 22 |

| | Example 11 Reaction time [h] | |
|---|---|---|
| Analytical data | 0 | 24 |
| $M_w$ [kg/mol] | 266 | 145 |
| $M_n$ [kg/mol] | 73 | 56 |
| PDI | 3.6 | 2.6 |
| Viscosity [mPa*s] | 2599 | 662 |
| Viscosity/$M_w$ [Pa*s*mol/kg] | 0.0098 | 0.0040 |

Examples 12*-16*: Reaction of NBR with M71 SIPr or M73 SIPr Catalyst and Additions in the Presence of Olefin

Rubber

| Name | ACN content [% by wt.] | ML1+ 4(100° C.) [MU] | Amount [g] |
|---|---|---|---|
| NBR-3 | 34 | 30 | 75.00 |

| | Catalyst | | | Reaction conditions | | | | |
|---|---|---|---|---|---|---|---|---|
| | | | | Ru based | Co-olefin | | Addition | | |
| No. | Type | Amount [mg] | Amount [mmol] | on NBR [ppm] | Type | Amount [phr] | Type | Amount [phr] | Temp. [° C.] |
| 12* | M71 SIPr | 5.42 | 0.0066 | 9 | 1-hexene | 4 | LiBr | 1.8 | 22 |

-continued

| No. | Catalyst Type | Amount [mg] | Amount [mmol] | Ru based on NBR [ppm] | Co-olefin Type | Amount [phr] | Addition Type | Amount [phr] | Temp. [° C.] |
|---|---|---|---|---|---|---|---|---|---|
| 13* | M73 SIPr | 5.45 | 0.0066 | 9 | 1-hexene | 4 | Ti(OiPr)$_4$ | 0.039 | 22 |
| 14* | M73 SIPr | 10.9 | 0.0132 | 18 | 1-hexene | 4 | MgCl$_2$ | 0.65 | 22 |
| 15* | M71 SIPr | 5.42 | 0.0066 | 9 | 1-hexene | 4 | CaCl$_2$ | 0.5 | 22 |
| 16* | M73 SIPr | 10.9 | 0.0132 | 18 | 1-hexene | 4 | LiCl | 0.65 | 22 |

| Analytical data | Example 12 Reaction time [h] | | | | Example 13 Reaction time [h] | | | |
|---|---|---|---|---|---|---|---|---|
| | 0 | 1 | 3 | 24 | 0 | 1 | 3 | 24 |
| $M_w$ [kg/mol] | 273 | 59 | 51 | 50 | 273 | 84 | 82 | 81 |
| $M_n$ [kg/mol] | 75 | 25 | 23 | 23 | 75 | 37 | 34 | 35 |
| PDI | 3.7 | 2.3 | 2.2 | 2.1 | 3.7 | 2.3 | 2.4 | 2.3 |
| Viscosity [mPa*s] | 2599 | — | — | 46 | 2599 | — | — | 126 |
| Viscosity/$M_w$ [Pa*s*mol/kg] | 0.0098 | — | — | 0.0009 | 0.0098 | — | — | 0.0016 |

| Analytical data | Example 12 Reaction time [h] | | | | Example 13 Reaction time [h] | | | |
|---|---|---|---|---|---|---|---|---|
| | 0 | 1 | 3 | 24 | 0 | 1 | 3 | 24 |
| $M_w$ [kg/mol] | 273 | 53 | 49 | 49 | 273 | 80 | 71 | 68 |
| $M_n$ [kg/mol] | 75 | 23 | 21 | 23 | 75 | 37 | 33 | 32 |
| PDI | 3.7 | 2.2 | 2.4 | 2.1 | 3.7 | 2.1 | 2.1 | 2.1 |
| Viscosity [mPa*s] | 2599 | — | — | 46 | 2599 | — | — | 93 |
| Viscosity/$M_w$ [Pa*s*mol/kg] | 0.0098 | — | — | 0.0009 | 0.0098 | — | — | 0.0014 |

| Analytical data | Example 16 Reaction time [h] | | | |
|---|---|---|---|---|
| | 0 | 1 | 3 | 24 |
| $M_w$ [kg/mol] | 273 | 40 | 28 | 22 |
| $M_n$ [kg/mol] | 75 | 18 | 13 | 11 |
| PDI | 3.7 | 2.2 | 2.1 | 2.1 |
| Viscosity [mPa*s] | 2599 | — | — | 16 |
| Viscosity/$M_w$ [Pa*s*mol/kg] | 0.0098 | — | — | 0.0007 |

Experiment 17*: Reaction of HNBR with M73 SIPr Catalyst without Olefin

| Rubber | | | | |
|---|---|---|---|---|
| Name | Type | ACN content [% by wt.] | ML1 + 4 (100° C.) [MU] | Amount [g] |
| HNBR | Therban 3467 | 34 | 68 | 50.20 |

| | Reaction conditions | | | |
|---|---|---|---|---|
| | Catalyst | | | |
| No. | Type | Amount [mg] | Amount [mmol] | Ru based on NBR [ppm] | Temperature [° C.] |
| 17* | M73 SIPr | 61.9 | 0.0750 | 151 | 100 |

| | Example 18 Reaction time [h] | |
|---|---|---|
| Analytical data | 0 | 24 |
| $M_w$ [kg/mol] | 285 | 186 |
| $M_n$ [kg/mol] | 83 | 71 |
| PDI | 3.4 | 2.6 |
| Viscosity [mPa*s] | 3719 | 1395 |
| Viscosity/$M_w$ [Pa*s*mol/kg] | 0.0131 | 0.0075 |

Example 18: Reaction of HNBR with Grubbs-Hoveyda 1 Catalyst without Olefin

| | | Rubber | | |
|---|---|---|---|---|
| Name | Type | ACN content [% by wt.] | ML1 + 4 (100° C.) [MU] | Amount [g] |
| HNBR | Therban 3467 | 34 | 68 | 50.20 |

| | Reaction conditions | | | |
|---|---|---|---|---|
| | Catalyst | | | |
| No. | Type | Amount [mg] | Amount [mmol] | Ru based on NBR [ppm] | Temperature [° C.] |
| 18 | Grubbs-Hoveyda II | 66.3 | 0.0750 | 151 | 100 |

The inventive examples 5a*, 5b*, 7a*, 7b*, 8a* and 8b* show that the use of the catalysts M71 SIPr, M73 SIPr and M74 SIPr in the cross-metathesis of nitrile rubber with 1-hexene after reaction times of 24 hours gives lower molar masses ($M_w$ and $M_n$) than in the non-inventive examples 1a, 1b, 2a, 2b, 3a, 3b, 4a, 4b, 6a and 6b in which the Grubbs-II, Grubbs-Hoveyda, Zhan 1B, M71 SIMes and M73SIMes catalysts were used. The lower molar masses were achieved both with catalyst inputs of 9 ppm of Ru and of 18 ppm of Ru.

In addition, it is shown that, for the achievement of equal final molar masses of the nitrile rubber, in the case of inventive use of the catalysts M71 SIPr, M73 SIPr and M74 SIPr, it is possible to reduce the amounts of ruthenium by comparison with the catalysts Grubbs-II, Grubbs-Hoveyda, Zhan 1B, M71 SIMes and M73 SIMes. The reduction in the amount of costly precious metal enables more economically viable performance of the cross-metathesis of nitrile rubber.

Examples 9, 10* and 11 show that, with identical ruthenium inputs of 67 ppm, the inventive use of M73 SIPr (Example 10*) for the self-metathesis of nitrile rubber (without addition of 1-olefin as co-olefin), the molar mass ($M_w$ and $M_n$) of the nitrile rubber after a reaction time of 24 hours is lower than in the case of use of M73 SIMes (Example 9) and Grubbs-Hoveyda II (Example 11). Example 10* shows that the inventive use of the catalyst M73 SIPr enables more economical use of ruthenium than with the catalysts used to date for the metathesis of nitrile rubber.

Example 17* shows that the inventive use of the catalyst M73 SIPr in the self-metathesis of partly hydrogenated nitrile rubber, by comparison with the Grubbs-Hoveyda II catalyst (Example 18), after 24 hours, gives lower molar masses ($M_W$ and M). Inventive use of the catalyst M73 SIPr enables more economic use of the costly precious metal ruthenium.

IV Hydrogenations

The hydrogenations which follow were conducted using NBR-8 from ARLANXEO Deutschland GmbH having the characteristics listed in Table 2.

Procedure for the Hydrogenations

Dry monochlorobenzene (MCB) was purchased from VWR and used as obtained. The results of the hydrogenation experiments are summarized in Table 7.

The hydrogenations 1 to 4* were performed in a 101 high-pressure reactor under the following conditions:
Solvent: monochlorobenzene
Substrate: NBR-8
Solids concentration: 12 wt. % NBR-8 in MCB (518 g)
Reactor temperature: 137° C. to 140° C.
Reaction time: 4 h
Catalyst loading: 0.2027 g (0.04 phr)
Hydrogen pressure (p $H_2$): 8.4 MPa
Stirrer speed: 600 rpm The polymer solution containing NBR-8 is degassed 3 times with $H_2$ (23° C., 2.0 MPa) under vigorous stirring. The temperature of the reactor was raised to 100° C. and the $H_2$ pressure to 60 bar. 50 g of a monochlorobenzene solution of the catalyst (0.2027 g) were added and the pressure was raised to 8.4 MPa, while the reactor temperature was adjusted to 138° C. Both parameters were kept constant during the reaction. The progression of the reaction was monitored by means of measurement of the residual double bond content (RDB) of the nitrile rubber by means of IR spectroscopy. The reaction was ended after 4 hours by releasing the hydrogen pressure.

TABLE 7

Overview of the hydrogenation experiments

| | Nitrile rubber | | | Catalyst | | Hydrogenation progress | | | | |
|---|---|---|---|---|---|---|---|---|---|---|
| | | Amount | Conc. in MCB | | Amount | Amount | (RDB in [%]) | | | |
| No. | Type | [g] | [% by wt.] | Type | [g] | [phr] | 0 h | 1 h | 2h | 3h | 4 h |
| 1 | NBR-8 | 518 | 12 | M73 SIMes | 0.2027 | 0.4 | 100 | 43.5 | 28.7 | 22.1 | 17.6 |
| 2 | NBR-8 | 518 | 12 | M73 SIPr | 0.2027 | 0.04 | 100 | 2.1 | 0.8 | 0.5 | 0.4 |

TABLE 7-continued

Overview of the hydrogenation experiments

| No. | Nitrile rubber Type | Amount [g] | Conc. in MCB [% by wt.] | Catalyst Type | Amount [g] | Amount [phr] | Hydrogenation progress (RDB in [%]) 0 h | 1 h | 2h | 3h | 4 h |
|---|---|---|---|---|---|---|---|---|---|---|---|
| 3 | NBR-8 | 518 | 12 | M71 SIMes | 0.2027 | 0.04 | 100 | 1.5 | 0.4 | — | — |
| 4 | NBR-8 | 518 | 12 | M71 SIPr | 0.2027 | 0.04 | 100 | 1.5 | 0.5 | — | — |

The examples adduced above show an at least equally good or even distinctly faster progression of the hydrogenation for the inventive catalysts M73 SIPr and M71 SIPr under equivalent experimental conditions by comparison with the catalysts M73SIMes and M71 SIMes.

The invention claimed is:

1. A process for reducing the molecular weight of nitrile rubber, said process comprising conducting a metathesis reaction of a reaction mixture comprising the nitrile rubber, optionally in the presence of a co-olefin, and in the presence of a ruthenium complex catalyst selected from the group consisting of:

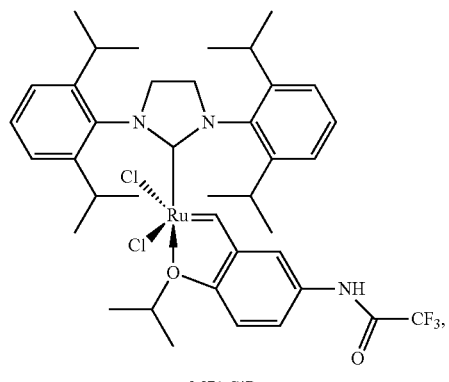

M71 SiPr

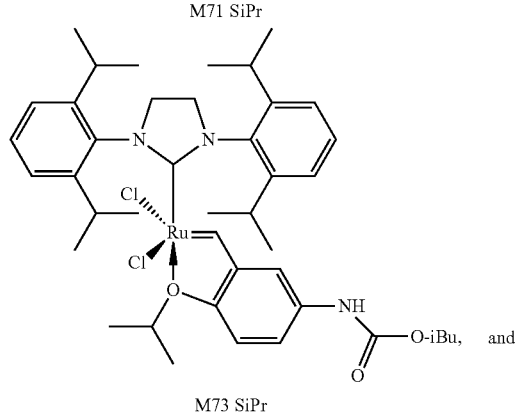

M73 SiPr

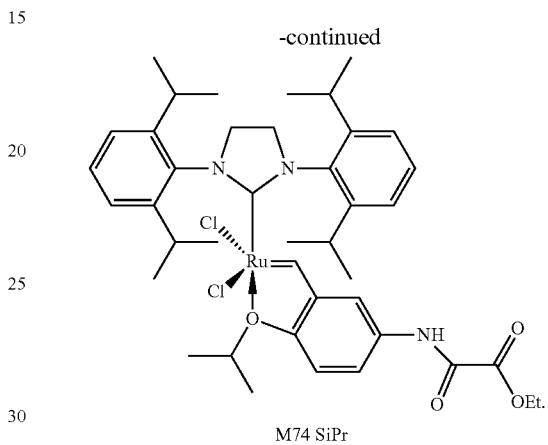

M74 SiPr

2. Process for reducing the molecular weight of nitrile rubber according to claim 1, wherein the amount of catalyst used is 5 to 1000 ppm of precious metal, based on the nitrile rubber used.

3. Process for reducing the molecular weight of nitrile rubber according to claim 1, which is conducted in the presence of a co-olefin.

4. Process for reducing the molecular weight of nitrile rubber according to claim 1, wherein the concentration of the nitrile rubber in the reaction mixture is in the range from 1% by weight to 30% by weight, based on a weight of the reaction mixture.

5. Process for reducing the molecular weight of nitrile rubber according to claim 1, which is conducted at a temperature in the range from 10° C. to 150° C.

6. Process for reducing the molecular weight of nitrile rubber according to claim 1, wherein one or more further copolymerizable monomers are used.

7. Process for reducing the molecular weight of nitrile rubber according to claim 1, in which the metathesis reaction of the nitrile rubber is followed by a hydrogenation reaction of the unsaturated C=C double bonds in the nitrile rubber.

* * * * *